United States Patent
Iwai et al.

(10) Patent No.: US 6,374,161 B1
(45) Date of Patent: Apr. 16, 2002

(54) AUTOMOBILE CONTROL SYSTEM AND METHOD CAPABLE OF REVISING CONTROL DATA TRANSMISSION FUNCTION

(75) Inventors: Akihito Iwai, Chiryu; Hirotaka Sakai, Handa, both of (JP)

(73) Assignee: Denso Corporation, Aichi-pref. (JP)

(*) Notice: Subject to any disclaimer, the term of this patent is extended or adjusted under 35 U.S.C. 154(b) by 0 days.

(21) Appl. No.: 09/551,870

(22) Filed: Apr. 18, 2000

(30) Foreign Application Priority Data

Apr. 26, 1999 (JP) .......................... 11-118539
Apr. 26, 1999 (JP) .......................... 11-118541

(51) Int. Cl.[7] .......................... B60R 16/02; G60G 15/82
(52) U.S. Cl. .............................. 701/1; 701/36; 701/48; 709/201
(58) Field of Search .................... 701/1, 36, 48; 712/28, 200, 201; 370/466, 395, 401; 709/201, 102, 223; 710/29, 30

(56) References Cited

U.S. PATENT DOCUMENTS

| | | | | |
|---|---|---|---|---|
| 5,189,617 A | * | 2/1993 | Shiraishi | 364/424.05 |
| 5,696,920 A | * | 12/1997 | Miyata et al. | 395/377 |
| 5,699,250 A | * | 12/1997 | Kobayashi | 364/424.058 |
| 5,737,711 A | * | 4/1998 | Abe | 701/29 |
| 5,757,773 A | | 5/1998 | Tsuji | 370/241 |
| 5,832,397 A | * | 11/1998 | Yoshida et al. | 701/29 |
| 6,038,500 A | * | 3/2000 | Weiss | 701/22 |
| 6,047,002 A | * | 4/2000 | Hartmann et al. | 370/466 |
| 6,067,612 A | * | 5/2000 | Sasaki et al. | 712/28 |

FOREIGN PATENT DOCUMENTS

JP  9-200234  7/1997

OTHER PUBLICATIONS

U.S. Patent Application No. 09/512,460.

* cited by examiner

Primary Examiner—Tan Nguyen
Assistant Examiner—Dalena Tran
(74) Attorney, Agent, or Firm—Nixon & Vanderhye P.C.

(57) ABSTRACT

An automobile control system has a microcomputer that subjects each control data to be transmitted to a communication opponent to LSB conversion (accuracy conversion) to convert the control data to the data having the resolution acceptable for the communication opponent. The microcomputer stores a plurality of types of LSB conversion programs and a physical value conversion table. The microcomputer activates the physical value conversion program corresponding to the control data to be transmitted this time based on information listed in the table and subjects the control data to LSB conversion process according to the program of the physical value conversion. The microcomputer further has a Handle number specification table and a packet number specification table. The microcomputer generates the packet data to be transmitted based on the two tables. A transmission target packet number is used for regular transmission and the Handle number of the data to be event-transmitted is used for event transmission.

13 Claims, 19 Drawing Sheets

FIG. 4

SHARED MEMORY TABLE

| Handle No. | ADDRESS | SIZE |
|---|---|---|
| Handle 1 | $FFFF0000 | 2 bytes |
| Handle 2 | $FFFF0002 | 2 bytes |
| Handle 3 | $FFFF0004 | 1 byte |
| Handle 4 | $FFFF0005 | 1 byte |
| ⋮ | ⋮ | ⋮ |
|  |  |  |

FIG. 5

DATA SPECIFICATION TABLE

| PACKET No. | PERIOD | OFFSET | SIZE |
|---|---|---|---|
| PN1 | 1S | 0 | 4 |
| PN2 | 3S | 4 | 3 |
| PN3 | 5S | 7 | 5 |
| PN4 | 0.5S | 12 | 2 |
|  |  |  |  |
|  |  |  |  |
|  |  |  |  |

FIG. 6

PHYSICAL VALUE CONVERSION TABLE

| Handle No. | DATA POSITION | DATA SIZE | CALL ADDRESS |
|---|---|---|---|
| Handle 1 | 0 | 2 bytes | $00001000 |
| Handle 10 | 2 | 1 byte | $00001100 |
| Handle 5 | 3 | 3 bytes | $00101100 |
| Handle 2 | 6 | 2 bytes | $00001000 |
| Handle 2 | 0 | 2 bytes | $01101100 |
| Handle 3 | 2 | 2 bytes | $01101100 |
| Handle 6 | 4 | 4 bytes | $00001100 |
|  |  |  |  |
|  |  |  |  |
|  |  |  |  |

FIG. 15A

| PACKET No. | PERIOD | Handle No. | | | | | | COMM. SYSTEM | HEADER |
|---|---|---|---|---|---|---|---|---|---|
| PN1 | 1S | 1 | 10 | 5 | 2 | E | | CAN | Arbitration=0×123 ML=08 |
| PN2 | 3S | 2 | 3 | 6 | 7 | | | SCI | ID=1 ML=16 |
| PN3 | 5S | 15 | 5 | 12 | 3 | | | SCI | ID=2 ML=16 |
| PN4 | 0.5S | 1 | 10 | E | E | | | | ... |
| .. | | | | | | | | | |

FIG. 15B

| Handle No. | DATA POSITION | DATA SIZE | EVENT TRANSMISSION PACKET No. | | | LSB CONVERSION CALL ADDRESS |
|---|---|---|---|---|---|---|
| 1 | 0 | 2 bytes | PN1 | PN4 | E | $00001000 |
| 2 | 6 | 2 bytes | PN1 | PN2 | E | $00001000 |
| 3 | 0 | 2 bytes | E | | | $01101100 |
| 4 | 0 | 2 bytes | PN5 | E | | $01101100 |
| 5 | 3 | 3 bytes | PN1 | E | | $00101100 |
| 6 | 2 | 4 bytes | E | | | $00001100 |
| .. | .. | .. | .. | .. | | .. |
| 10 | 2 | 1 byte | PN4 | E | | $00001100 |
| .. | | | | | | |

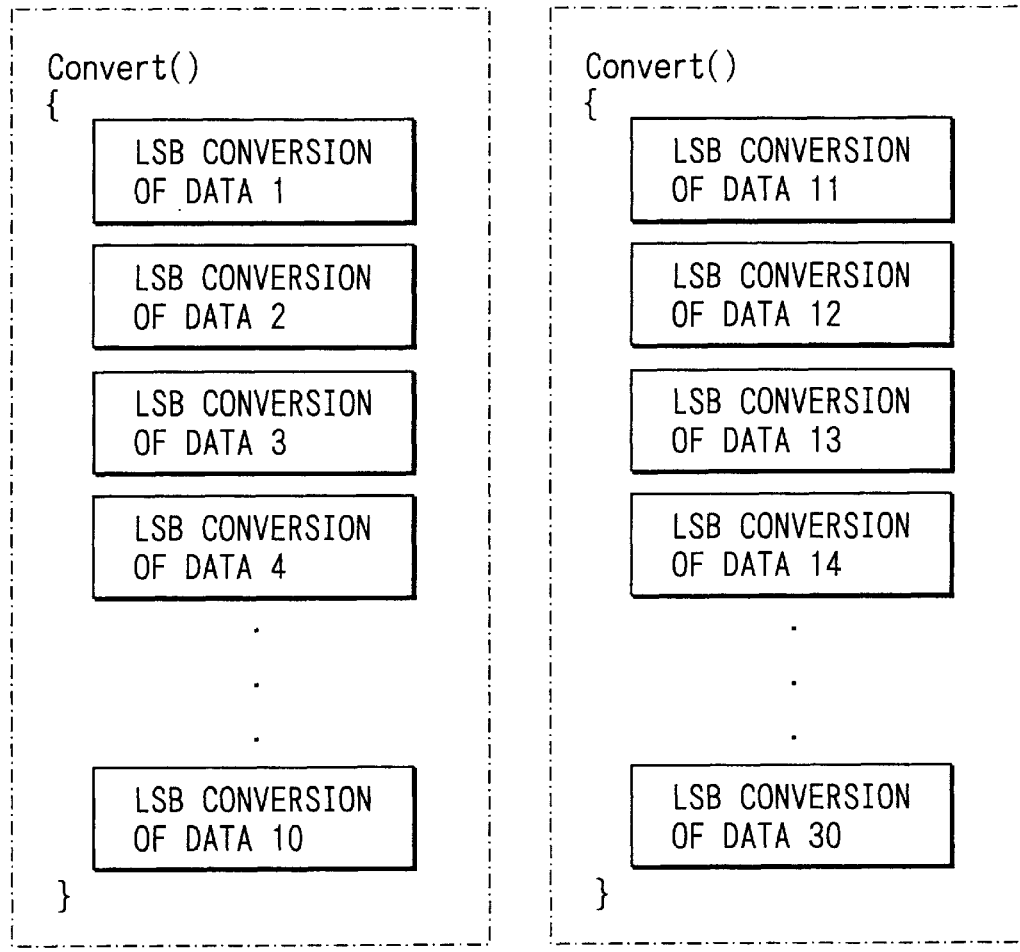

AUTOMOBILE CONTROL SYSTEM AND METHOD CAPABLE OF REVISING CONTROL DATA TRANSMISSION FUNCTION

CROSS REFERENCE TO RELATED APPLICATION

This application relates to and incorporates herein by reference Japanese Patent Applications No. 11-118539 filed on Apr. 26, 1999 and No. 11-118541 filed on Apr. 26, 1999.

BACKGROUND OF THE INVENTION

The present invention relates to an automobile control system and method having an information processing unit which shares control data with other information processing units provided in the same or different control systems.

An automobile control system for controlling a control target such as an engine or transmission mounted on an automobile is provided with a microcomputer (MC) as an information processing unit for performing arithmetic operations for controlling the control target. The control system is generally constructed as shown in FIG. 21. A microcomputer 600 in an engine ECU (electronic control unit) takes in various signals such as engine rotation pulse, automobile speed pulse, and shift-lever position signal through an input/output circuit 602. It performs arithmetic process for controlling an engine (not shown) through actuators.

Various control data that represent physical values such as the engine speed calculated by the microcomputer 600 in the engine ECU are sent out from the microcomputer 600 to a communication IC 604 at the predetermined timing, and sent out further to a driver circuit 606 through an internal communication line. Other ECUs (communication opponents) such as a meter ECU receive supplied control data through an external communication line, and use these data for controlling respective control targets.

In the automobile control system that involves communication among ECUs, in some cases, the resolution of data required in each ECU is different even though the same type of control data is processed. For example, the engine ECU calculates the control quantity for controlling the engine by processing the engine speed control data with the resolution of 50/256 (approximately 0.195) rpm per LSB (per least significant 1 bit). On the other hand, the meter ECU processes the engine speed control data with the resolution of 1 rpm per LSB. Thus, the control data to be transmitted from one ECU to another ECU should be converted before the transmission so that the resolution or accuracy of the data should match each other.

As exemplified in FIG. 22, in the conventional ECU, a plurality of accuracy-conversion programs (LSB conversion programs 1 and 2) to be executed by the microcomputer of the side that transmits the control data are provided for each preset conversion period. Each LSB conversion program performs accuracy conversion process (LSB conversion process) corresponding to the resolution involved in the communication opponent side on each of the plurality of control data. The LSB conversion program 1 for DATA 1–DATA 10 is activated every 16 ms and LSB conversion program 2 for DATA 11–DATA 30 is activated every 64 ms. Specifically, the conventional ECU LSB-converts each control data to be transmitted periodically, and retrieves a control data to be transmitted selectively from among LSB-converted control data at the transmission timing, for example, that occurs every predetermined transmission period. It transmits it to the communication opponent. Therefore, the execution period of each LSB conversion programs 1 and 2 is set to a time shorter than the transmission period transmitted to the communication opponent.

When the content of the LSB conversion is to be changed or when the transmission period of the control data is to be changed, many steps of the program must be revised when the content of the LSB conversion or transmission period is changed. This revision or correction is not simple. Furthermore it is disadvantageous in that it is impossible to specify particular steps of the program to be revised without understanding of the whole program.

Further, the microcomputer 604 does not transmit various data individually but transmits these data in a packet after arranging a plurality of types of data such as the engine speed data, automobile speed data, and fail-safe data for activating a warning lamp. In this instance, generally, header information corresponding to a communication protocol is added to the head of packet data as shown in FIG. 23.

The packet data is categorized into two types. One is the data to be transmitted periodically with a predetermined time interval, and the other is the data to be transmitted immediately after update of the content. Further, the transmission timing is categorized into two types. One is a regular transmission which is effected at regular time interval, and the other is an event transmission which is effected only when a predetermined event such as a completion of 20 times of fuel injection occurs.

In the conventional system, all the packet data to be transmitted are generated every predetermined time interval, even though different types of packet data are transmitted at every each transmission timing. Thus, all the packet data must be updated and stored successively always, requiring a large memory area and a lot of ineffective process. When the type of the data that constitutes each packet data or the location position of the data in a packet data is to be changed, it is required to check the packet generation program in detail for revision, also requiring a lot of time and labor. When the transmission period of any packet data is to be changed shorter, the process must be corrected so that the packet data is generated by means of a program executed at shorter period than the transmission period after change, requiring understanding of the whole program.

SUMMARY OF THE INVENTION

It is therefore an object of the present invention to provide an automobile control system that requires a minimum number of program revisions, even when a predetermined process such as an accuracy conversion or packet data generation required for transmitting control data to a communication opponent is changed.

According to a first aspect of the present invention, a transmission command is issued to indicate control data to be transmitted this time to a communication opponent at the predetermined transmission timing, and the control data indicated by the transmission command is retrieved from a memory unit. In this instance, a conversion program corresponding to the control data indicated by the transmission command is specified. The specified conversion program is activated to process the retrieved control data to thereby subject the control data indicated by the transmission command to an accuracy conversion process. Furthermore, the accuracy-converted control data is transmitted to the communication opponent after the accuracy conversion process.

According to a second aspect of the present invention, a first data table and a second data table are provided. The first data table lists the type number of the transmission target data that constitutes a packet data of the packet number for each packet number that is the identification number of the packet data. The second data table lists the packet number of the packet data that includes the transmission target data of the type number as component and the location position information for indicating the location position in the packet data of the transmission target data of the type number for each type number of the transmission target data. The data map for defining the information used for generating a regular transmission packet data and an event transmission packet data is divided into the first data table and the second data table. As a result, in any of the regular transmission and the event transmission, a packet data to be transmitted at that time can be generated quickly. It is not necessary to generate periodically the packet data to be transmitted beforehand, and thus the redundant process and memory area are eliminated. That is, the transmission target packet data can be generated quickly and efficiently when data transmission is required not only in the regular transmission but also in the event transmission.

BRIEF DESCRIPTION OF THE DRAWINGS

Other objects, features and advantages of the present invention will become more apparent from the following detailed description made with reference to the accompanying drawings. In the drawings:

FIG. 4 is a table showing a shared memory table data stored in a table storage unit;

FIG. 5 is a table showing data specification table data stored in a table storage unit;

FIG. 6 is a table showing a physical value conversion table data stored in a table storage unit;

FIGS. 15A and 15B are tables describing Handle number specification table data and packet number specification table data;

FIG. 22 is a schematic diagram showing accuracy conversion process programs (LSB conversion programs) used in the conventional automobile control system; and FIG. 23 is a schematic diagram showing a packet data format formed in the conventional automobile control system.

DETAILED DESCRIPTION OF THE PREFERRED EMBODIMENT

Figure 1:
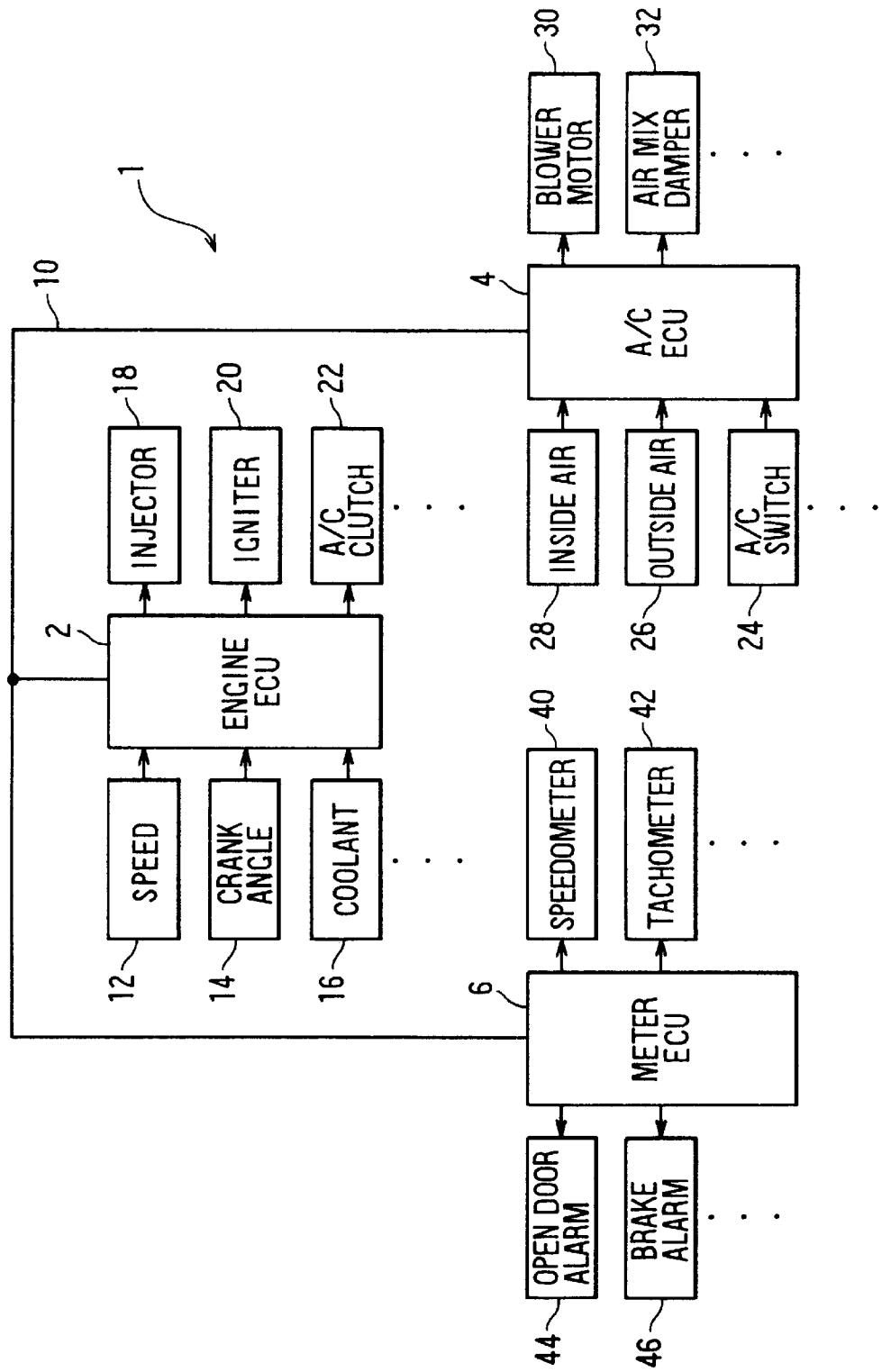
FIG. 1 is a block diagram showing an automobile control system according to a first embodiment of the present invention.

An automobile control system according to the present invention will be described with reference to embodiments. Same or similar reference numerals are used to denote same or similar parts or functions throughout the following embodiments.

FIRST EMBODIMENT

Referring first to FIG. 1, an automobile control system 1 is provided with an electronic control unit (engine ECU) 2 for mainly controlling an engine and transmission, an electronic control unit (air conditioner ECU) 4 for controlling an air conditioner, and an electronic control unit (meter ECU) 6 for controlling meters and alarm lamps in a meter panel. The above three ECUs 2, 4 and 6 are connected to be capable of communication there among through a multiple communication line 10.

The engine ECU 2 detects the operation status of the automobile based on detection signals transmitted from various sensors such as a speed sensor 12 for detecting the automobile speed SPD, a crank angle sensor 14 for detecting the engine speed (rotation speed Ne), and a coolant temperature sensor 16 for detecting the cooling water temperature of the engine (cooling water temperature THW). The engine ECU 2 controls the engine and transmission to its optimal condition by driving actuators such as an injector 18, an igniter 20, and the like based on the detection results and outside air temperature TAM data transmitted from the air conditioner ECU 4 as described below.

Furthermore, the engine ECU 2 transmits the control data that indicate the operation status such as the automobile speed SPD, rotation speed Ne, and cooling water temperature THW to the multiple communication line 10. It controls the engine to transmit the driving force of the engine to a coolant compressor of the air conditioner to activate the cooling operation of the air conditioner by actuating an air conditioner (A/C) magnet clutch 22 in response to the air conditioner control data AC transmitted from the air conditioner ECU 4 as described below.

The air conditioner ECU 4 detects the air temperature outside the automobile (outside air temperature) TAM and the air temperature inside the automobile (inside air temperature) based on the detection signals from an outside air sensor 26 and an inside air sensor 28, and actuates a blower motor 30 and an air mix damper 32 for switching air distribution depending on the detection results and the data indicating the automobile speed SPD, rotation speed Ne, and cooling water temperature THW transmitted from the engine ECU 2. The air conditioner ECU 4 transmits the air conditioner control data AC to the engine ECU 2 to actuate the A/C magnet clutch 22 when an air conditioner switch 24 is turned on by an automobile driver.

The meter ECU 6 drives a speedometer 40, a tachometer 42, and a cooling water temperature meter (not shown) that indicates the automobile speed SPD, rotation speed Ne, and cooling water temperature THW transmitted from the engine ECU 2. Furthermore, the meter ECU 6 lights an open door alarm lamp 44 for indicating that a door is open and a brake alarm lamp 46 for indicating that a parking brake is pulled up. It uses a signal from each door switch that is turned on/off depending on opening/closing of each door of the automobile and a signal from a parking brake switch that is turned on while the parking brake of the automobile is being pulled up.

ECUs 2, 4 and 6 are provided with respective microcomputers. Each microcomputer executes a program to realize the operation of the ECUs 2, 4 and 6.

Figure 2:
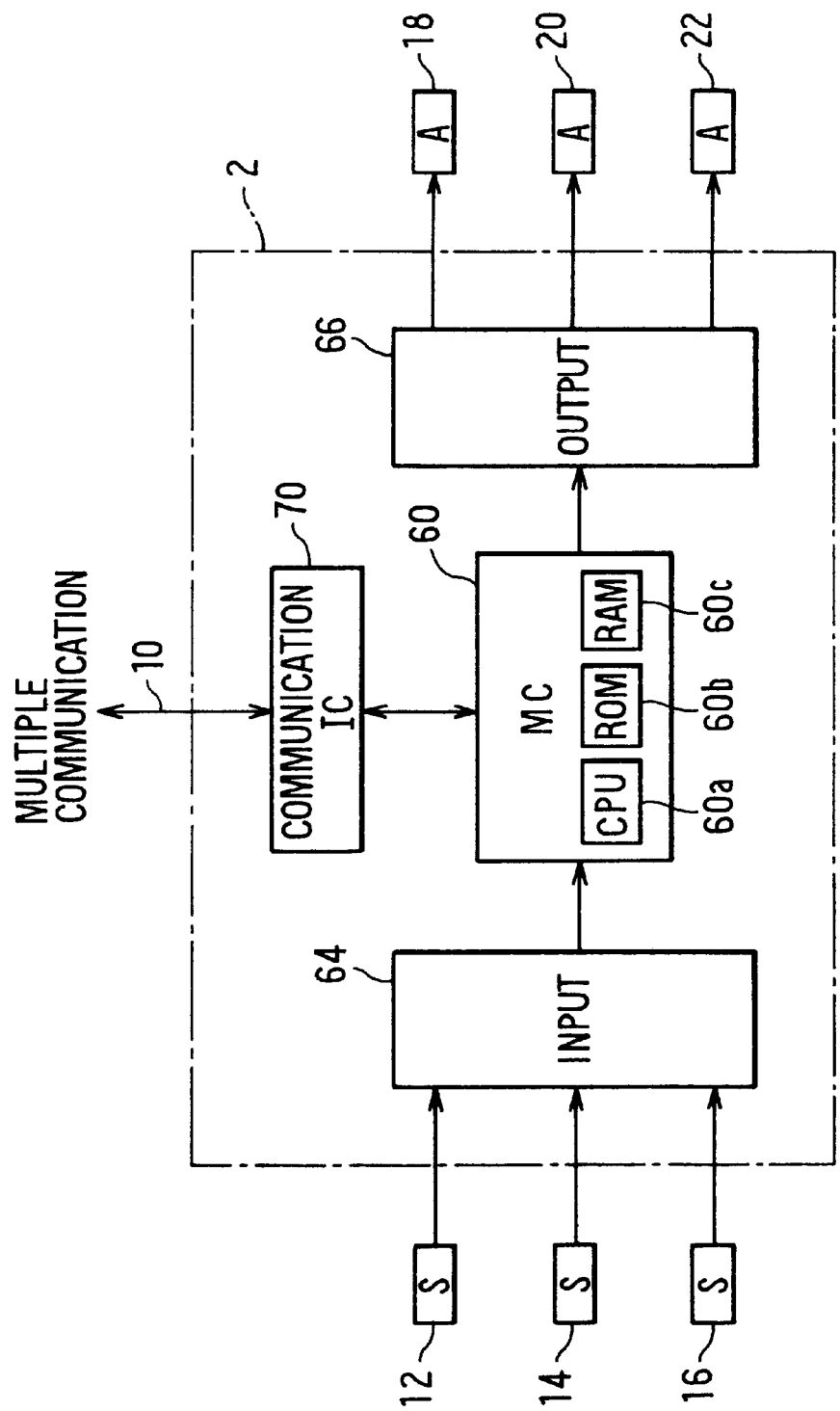
FIG. 2 is a block diagram showing an engine ECU used in the first embodiment shown in FIG. 1.

As shown in FIG. 2, the engine ECU 2 is provided with a microcomputer 60 as an information processing unit. The microcomputer 60 is an ordinary single chip microcomputer. Each microcomputer is provided with a CPU 60a, a ROM 60b for storing programs as a memory medium, a RAM 60c for storing various data temporarily, and an input/output port. In the present embodiment, each RAM of the microcomputer 60 stores 1 byte (8 bits) data per 1 address.

The microcomputer 60 receives the signal from the various sensors 12, 14 and 16 by way of an input circuit 64, executes arithmetic operations on the input signals, and sends out the control quantity signals to an output circuit 66 to thereby actuate various actuators such as the injector 18 and igniter 20.

Furthermore, the engine ECU 2 is provided with a communication IC 70. The communication IC 70 transmits the communication data train supplied from the microcomputer 60 to the multiple communication line 10 as the transmission signal. It sends out an interruption signal to the microcomputer 60 every time when the predetermined number of frames of the communication data train transmitted from the other ECUs 4 and 6 through the multiple communication line 10 is received.

Figure 3:
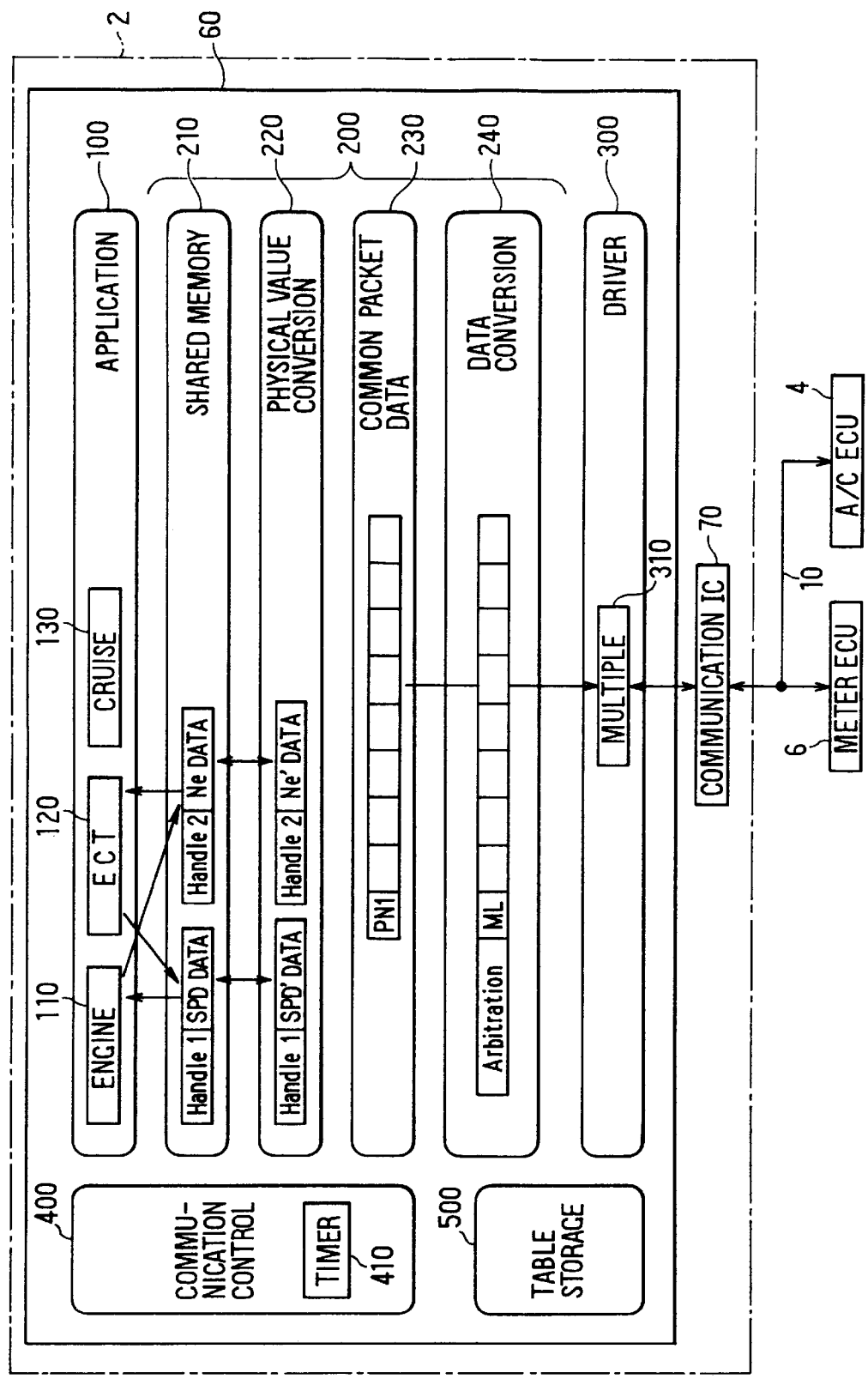
FIG. 3 is a functional diagram showing an imaginary communication model in a microcomputer used in the engine ECU shown in FIG. 2.

An imaginary communication model in the microcomputer 60 is shown in FIG. 3. This communication model has the hierarchy structure based on the ISO/OSI (Open System Interconnection) communication model.

As shown in FIG. 3, the communication model comprises an application unit 100 for performing arithmetic operation for controlling the control target, a communication driver unit 300 for communication of the data with the other ECUs 4 and 6, and a communication conversion unit 200 for generating the communication data train which the communication driver unit 300 will transmit from the control data calculated by the application unit 100. The communication conversion unit 200 converts the communication data train received by the communication driver unit 300 to the control data that is usable by the application unit 100. The communication conversion unit 200 is classified usually into a shared memory unit 210, a physical value conversion unit 220, a common packet data unit 230, and a communication data conversion unit 240. Furthermore, the microcomputer 60 is provided with a communication control unit 400 and a table storage unit 500.

The application unit 100 does not transfer the data directly to the communication opponent such as the air conditioner ECU 4 or the meter ECU 6. It rather transfers the data successively from the top layer to the bottom layer through the hierarchy (imaginary communication) to realize physical communication to the outside (communication opponent) by way of the communication driver unit 300. Each hierarchy of the communication model requests the service to the lower hierarchy and the lower hierarchy provides the service to the higher hierarchy. The purpose of each hierarchy is to hide the detailed information such as actual communication specification to the service in the higher layer.

In the present embodiment, the program in the ROM executed by the microcomputer 60 is programmed according to the object orientation in which the whole function of the program is divided into unit functions and an object is given to each unit function. The object is a program module comprising combined data and a program called as "method" that is a sequence to process the data.

Addressing only on the software in the communication model shown in FIG. 3, the units 100 to 400 other than the table storage unit 500 are objects (methods and data) stored in the ROM of the microcomputer 60. The table storage unit 500 is a memory area where tables described below with reference to FIGS. 4, 5 and 6 in the ROM of the microcomputer 60 are stored.

Furthermore, in the description of the present embodiment, the expression of action of the object as the subject of expression, for example, "the shared memory unit 210 performs . . . " or "the physical value conversion unit 220 performs . . . ", actually means that functional means that the microcomputer 60 realizes by operating according to the method of the object (that is, the microcomputer 60 executes the method of the object) performs the operation of the". . . ". Similarly, the passive expression of action by the object, for example, ". . . is performed by the shared memory unit 210" or ". . . is performed by the physical value conversion unit 220" actually means that the operation of the". . . " is performed by the functional means that the microcomputer 60 realizes by operating according to the method of the object.

The application unit 100 comprises objects that are formed by dividing the control target and control algorithm of the engine ECU 2 into individual control targets and control algorithms. In the present embodiment, the application unit 100 is provided with an object (engine application software) 110 that calculates the control data such as the rotation speed Ne and performs arithmetic operation for controlling the engine based on the calculated control data, an object (ECT application software) 120 that calculates the control data such as automobile speed SPD and performs arithmetic operation for controlling the transmission based on the calculated control data, and an object (cruise application software) 130 that calculates the control data such as throttle opening of the engine and performs throttle opening control arithmetic operation to keep the automobile in constant speed running based on the calculated control data. An application software among these application software 110, 120, and 130 uses the control data calculated by other application software in arithmetic operations performed by this application itself. That is, these application software 110, 120 and 130 use the control data commonly each other.

The shared memory unit 210 writes the control data commonly used by the application software 110, 120 and 130 and the control data (external common data) in the shared memory set as the specific memory area other than the control data memory area. The control data memory area is the memory area (memory means referred to as control data memory area) for temporarily storing all the control data used for controlling the control target by the application software 110, 120 and 130 of the application unit 100 in the RAM 60c provided in the microcomputer 60.

An identification number (Handle number) for indicating the data type is assigned to each data stored in the shared memory 210. Each object specifies a Handle number in order to obtain a necessary data from the shared memory 210 or in order to store a new data in the shared memory 210.

It is shown in FIG. 3 that the automobile speed SPD data calculated by the ECT application software 120 and having the Handle number 1 is used also by the engine application software 110. On the other hand, the rotation speed data calculated by the engine application software 110 and having the Handle number 2 is used also by the ECT application software 120. In the figures following FIG. 3 and the description in the following, Handle 1 or Handle 2 refers to the Handle number 1 or 2, respectively.

When the data is transmitted from the microcomputer 60 of the ECU 2 to the communication opponent (ECUs 4 and 6), the physical value conversion unit 220 performs LSB conversion. The LSB conversion is an operation for converting, with respect to the control data to be transmitted of the control data stored in the shared memory, its digital data to a digital data which represents the physical value in the resolution processed in the communication opponent. Furthermore, when the physical value conversion unit 220 receives the data from the communication opponent, the physical value conversion unit 220 performs LSB conversion on the received control data to convert the digital data to digital data which represents the physical value in the resolution processed in each of the application software 110, 120 and 130.

As described above, the LSB conversion process is the accuracy conversion process to convert the resolution of the digital data (physical value indicated per LSB of the data, accuracy of the data) to the same resolution as that of data used in the communication opponent. According to the present embodiment, plural kinds of LSB conversion programs (conversion program in the present embodiment) for performing the above LSB conversion process are stored in a predetermined area of the ROM as a part of the physical value conversion unit 220.

When the data is transmitted from the microcomputer 60 to the communication opponent, the common packet data unit 230 collects and arranges in series the control data to be transmitted that has been subjected to LSB conversion by the physical value conversion unit 220 to thereby generate a packet data (common packet data) common for the communication protocols that is independent of the communication protocols such as multiple communication, serial communication, or DMA communication. A packet number PN is given as an identification number to each common packet. In the figures following FIG. 3 and in the following description, PN1 or PN2 indicates the packet number PN 1 or 2, respectively.

When the data is transmitted from the microcomputer 60 to the communication opponent, the communication data conversion unit 240 converts the common packet data generated by the common packet data unit 230 to a communication data train corresponding to the communication protocol of the communication opponent. In detail, it adds header information or the like in conformity to the communication protocol to the data train of the common packet data.

The communication driver unit 300, when the data is transmitted from the microcomputer 60 to the communication opponent, sends out the communication data train generated by the communication data conversion unit 240 as the communication data actually at the transfer data quantity, baud rate, and transfer timing determined according to the communication protocol with the communication opponent.

The communication driver unit 300 is installed with a program which corresponds to the communication protocol of the communication opponent. In this embodiment, a program (multiple communication unit) 310 for multiple communication with the air conditioner ECU 4 and the meter ECU 6 is installed. Further, if the microcomputer 60 executes DMA communication with other microcomputers in the engine ECU 2, a DMA communication program for controlling DMA communication is installed in the communication driver unit 300. Still further, if the microcomputer 60 executes one-to-one serial communication with other ECUs, a serial communication program for controlling serial communication is installed in the communication driver unit 300.

The communication control unit 400 is provided with an internal timer 410 and determines the timing for performing the communication data train generation and LSB conversion so that the communication with the communication opponent is performed at the suitable timing. On the other hand, the communication driver unit 300 (multiple communication unit 310) receives and retrieves the data transmitted from the communication opponent (ECUs 4 and 6), and supplies the data to the communication data conversion unit 240.

The communication data conversion unit 240 also converts the communication data train retrieved by the communication driver unit 300 to a common packet data. Furthermore, the common packet data unit 230 divides the common packet data generated by the communication data conversion unit 240 when the data is received from the communication opponent, and extracts each control data that is a component of the common packet data. It also controls the physical value conversion unit 220 to apply LSB conversion to each control data so that each control data subjected to LSB conversion is updated and written in the shared memory 210.

The table storage unit 500 stores a shared memory table shown in FIG. 4, a data specification table shown in FIG. 5 and a physical value conversion table shown in FIG. 6.

As shown in FIG. 4, the shared memory table is a definition table that correspondingly defines the Handle number of the control data, a shared memory address for indicating which address is the head address stored in the shared memory, and a shared memory size for indicating the data length in the shared memory 210 of the control data corresponding to the Handle number.

As shown in FIG. 6, the physical value conversion table is a definition table that describes items correlatively, and the items included in this table are the Handle number of the control data, the common packet data position that indicates the location position of the control data corresponding to the Handle number in the common packet data, the common packet data size that indicates the data length of the control data corresponding to the Handle number in the common packet data, and the LSB conversion call address served as the storage position information that indicates what address of the ROM 60b is the head address of the stored LSB conversion program for LSB-converting the control data corresponding to the Handle number.

The common packet data position indicates that the head of the control data corresponding to the Handle number is located at what byte number in the common packet data wherein the first 1 byte in the common packet data is denoted as 0-th byte.

As shown in FIG. 5, the data specification table is a definition table that describes items correlatively, and the items included in this table are the packet number of the common packet data, the communication period for indicating the transmission interval of the common packet data corresponding to the packet number, and the offset and size for specifying each control data that constitutes the common packet data corresponding to the packet number.

The offset indicates the description position that is the number obtained by counting from the head wherein the first uppermost position is 0-th among description positions of the Handle number in the physical value conversion table shown in FIG. 6, and the size indicates the number of description positions of the Handle number obtained by counting downward from the description position indicated by means of the offset. In this embodiment, each Handle number described in each description position of the number indicated by the size from the description position indicated by the offset among Handle numbers described in the physical value conversion table shown in FIG. 6 is regarded as the Handle number of the control data that constitutes the common packet data of the packet number corresponding to the offset and size.

For example, in FIG. 5, because the offset and size corresponding to PN1 are 0 and 4 respectively, the common packet data PN1 is comprised of control data corresponding to four Handle numbers (Handle 1, Handle 10, Handle 5, Handle 2) described from the top row to the 4-th row in FIG. 6. Further, because the offset and size corresponding to PN2 are respectively 4 and 3 in FIG. 5, the common packet data PN2 is constituted of control data corresponding to three Handle numbers (Handle 2, Handle 3, Handle 6) described in 5-th row to 7-th row.

As described above, each object can obtain the information required to prepare the communication data train, for example, the information that the control data having what Handle number is summarized in the common packet data of PN1, by referring to the data specification table shown in FIG. 5 and the physical value conversion table shown in FIG. 6.

Figure 7:
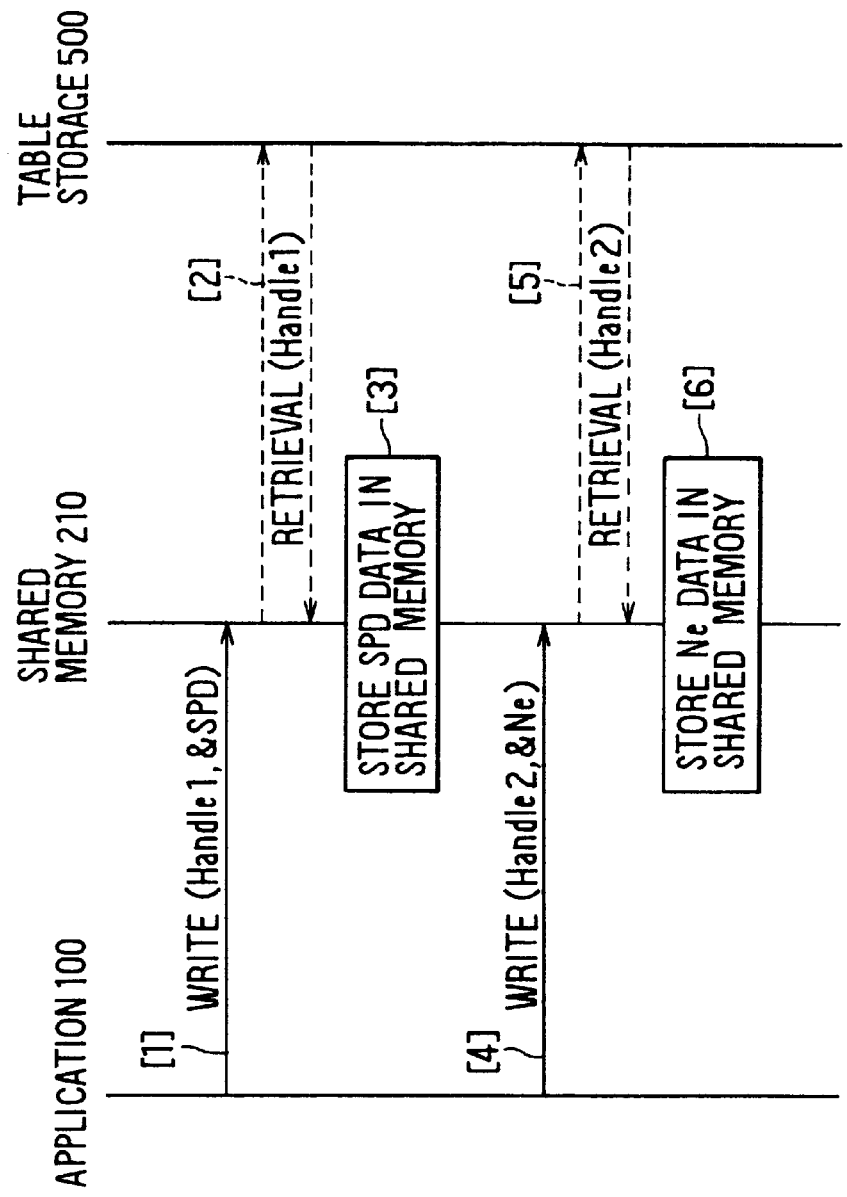
FIG. 7 is a message sequence diagram showing a process operation for storing a control data requested by an application unit in the shared memory.
Figure 8:
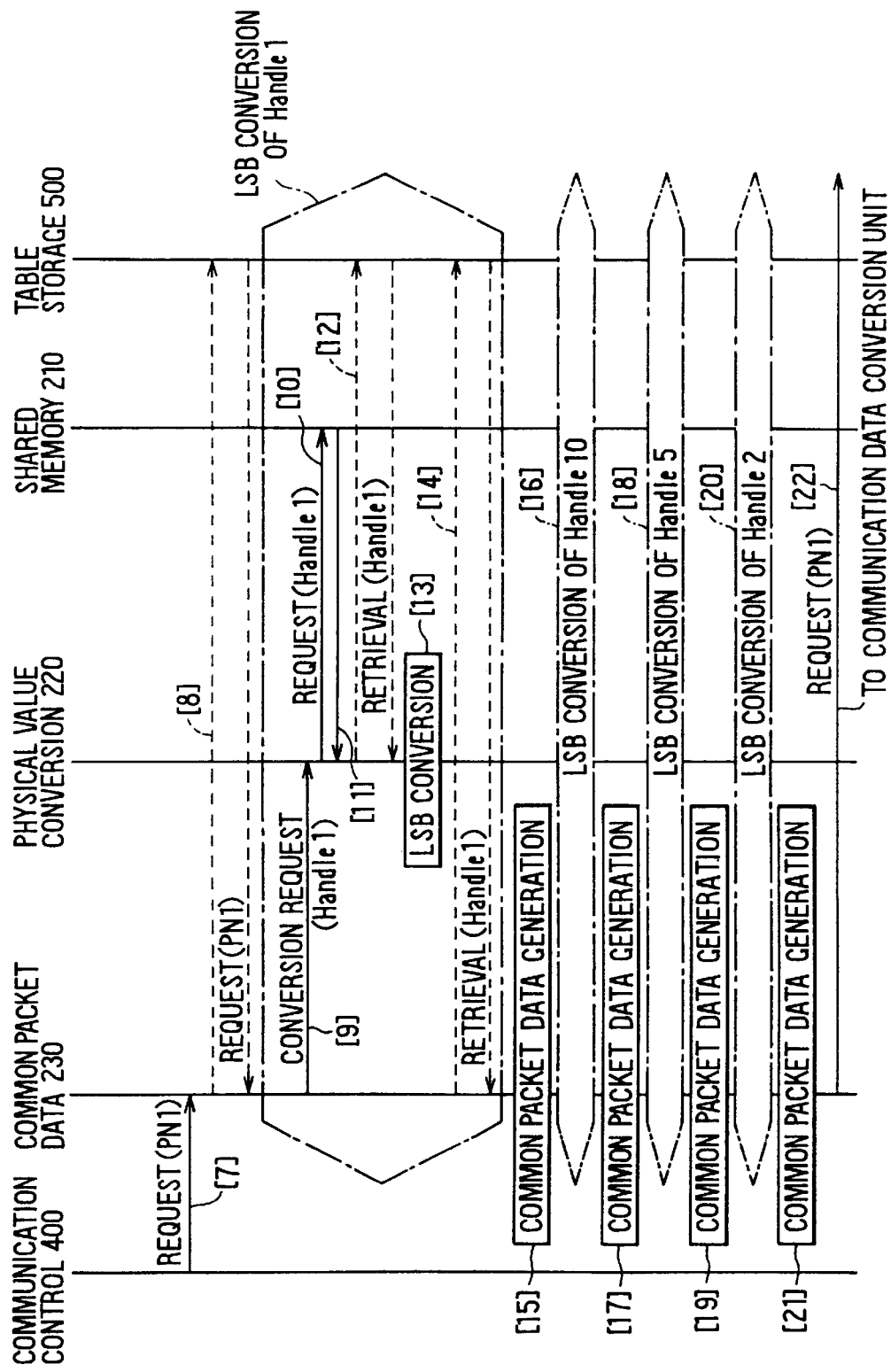
FIG. 8 is a message sequence diagram showing a process operation for generating common packet data from the control data stored in the shared memory.
Figure 9:
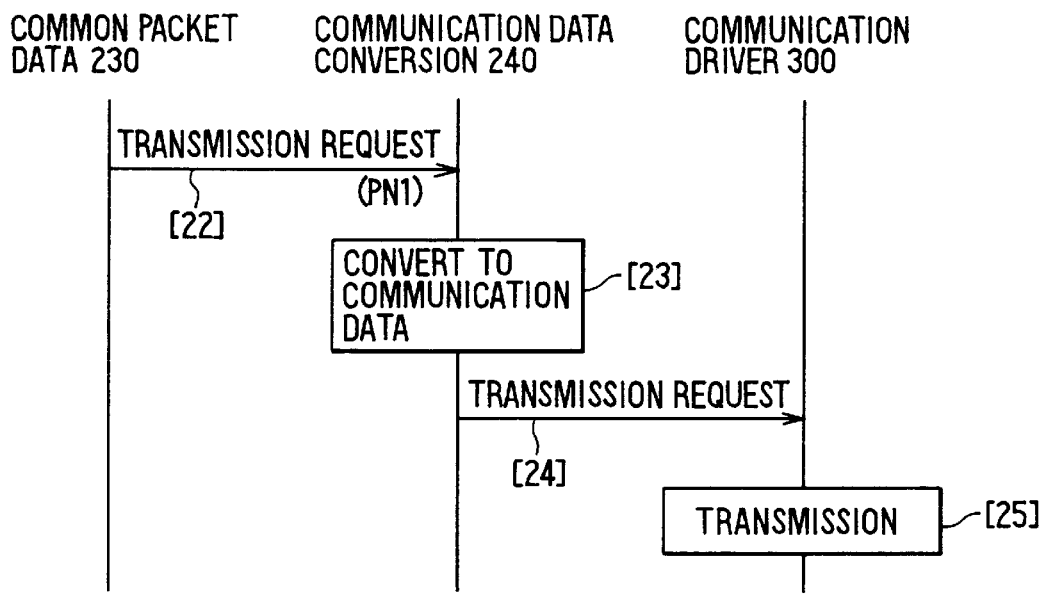
FIG. 9 is a message sequence diagram showing a process operation for converting the common packet data to a communication data train and for transmitting it.

Next, the conversion process for converting to the communication data train performed when the control data is transmitted from the microcomputer 60 to the communication opponent is described with reference to FIG. 7 to FIG. 10. FIG. 7 to FIG. 9 are message sequence diagrams showing the conversion process operation from the control data to the communication data train. In these message sequence diagrams, layers (objects) 100 to 500 shown in FIG. 3 are indicated by vertical lines, and the message from each layer to another layer is indicated by an arrow with horizontal solid line. Furthermore, an arrow with horizontal dotted line indicates that each layer refers the table in the table storage unit 500, and the content of the process performed in the layer is shown in the rectangular frame located on the vertical line. FIG. 10 is a schematic diagram for indicating the common packet data prepared by means of the process operation shown in FIG. 8.

First, for example, at the beginning of the process step for writing the automobile speed SPD data (SPD data), which is one of the external common data, in the shared memory 210 by use of the ECT application software 120 stored in the application unit 100, as shown by [1] in FIG. 7, the ECT application software 120 of the application unit 100 issues a data write request message to the shared memory unit 210. At this time, the information including the Handle number of the SPD data (in this example, Handle 1) and the storage address of the SPD data in the ECT application software 120 (the address in control data memory area for writing and reading the SPD data when the ECT application software 120 performs arithmetic process for controlling, in this example &SPD) is transmitted to the shared memory unit 210.

In the case that the process for issuing the data write request message is programmed by means of C-language, the message issuance command for writing the SPD data in the shared memory is defined as Write (Handle 1, &SPD).

This command means that the data (SPD data that the ECT application software 120 requests) stored in &SPD is written in the address of the shared memory corresponding to the Handle number (Handle 1) of the SPD data. In the case that application software 110, 120 and 130 of the application unit 100 write the control data other than the SPD data in the shared memory, Handle 1 in the command is replaced with the Handle number of the data to be written, and "&SPD" in the command is replaced with the address of the memory area in which the data to be written is stored among the control data memory area provided for the application software.

Upon receiving the message from the application unit 100 (ECT application software 120), the shared memory unit 210 refers the shared memory table (FIG. 4) in the table storage unit 500 and retrieves the shared memory address and shared memory size corresponding to the Handle number (Handle 1) transmitted together with the message as the shared memory information as shown by [2] in FIG. 7.

Then, the shared memory unit 210 recognizes that the SPD data is to be written in 2-byte area having the head address of $FFFF0000 in the shared memory based on the shared memory information retrieved as described above, and in the process of [3] in FIG. 7, copies the 2-byte SPD data from the storage address (&SPD) of the SPD data in the ECT application software 120 to $FFFF0000 address in the shared memory.

In the process performed by the shared memory unit 210, the SPD data corresponding to the Handle 1 is stored in the shared memory as exemplarily shown in the frame of the shared memory unit 210 in FIG. 3.

Furthermore, in the process step for writing the rotation speed data (Ne data), which is one of the external common data, in the shared memory by means of the engine application software 110 in the application unit 100, the engine application software 110 in the application unit 100 issues the data write request message to the shared memory unit 210 in the same manner as used in the case of the SPD data as shown by [4] in FIG. 7. At this time, the Handle number of Ne data (in this example, Handle 2) and the storage address of the Ne data in the engine application software 110 (that is, the address in the control data memory area for writing and reading the Ne data when the engine application software 110 performs arithmetic process for controlling, in this example, &Ne) is transmitted also to the shared memory unit 210.

Upon receiving the message from the application unit 100 (the engine application software 110), the shared memory unit 210 refers the shared memory table (FIG. 4) in the table storage unit 500 and retrieves the shared memory address and the shared memory size corresponding to the Handle number (Handle 2) transmitted together with the message as shown by [5] in FIG. 7.

Then, the shared memory unit 210 recognizes that the Ne data is to be written in 2-byte area having the head address of $FFFF0002 in the shared memory based on the shared memory information retrieved as described above. In the process of [6] in FIG. 7, it copies the 2-byte Ne data from the storage address (&Ne) of the Ne data in the engine application software 110 to $FFFF0002 address in the shared memory.

In the process performed by the shared memory unit 210, the Ne data corresponding to the Handle 2 is stored in the shared memory as exemplarily shown in the frame of the shared memory unit 210 shown in FIG. 3.

Other control data calculated by the engine application software 110 and the ECT application software 120 and the control data calculated by the cruise application software 120 are copied in the shared memory in the same manner as shown in FIG. 7.

On the other hand, though not shown in the figure, when the application unit 100 (each application software of the application unit 100) uses the control data written in the shared memory for controlling arithmetic process, the application unit 100 and the shared memory unit 210 operate as described below.

For example, a case that the engine application software 110 of the application unit 100 retrieves the SPD data calculated by the ETC application software 120 from the shared memory will be described. In this case, the engine application software 110 issues a data read request message to the shared memory unit 210. At that time, the information including the Handle number (Handle 1) of the SPD data and the storage address of the SPD data in the engine application software 110 (that is, the address of the control data memory area where the engine application software 110 writes or reads the SPD data for controlling in arithmetic process) is also transmitted to the shared memory unit 210.

The shared memory unit 210 refers to the shared memory table (FIG. 4) in the table storage unit 500 and retrieves the shared memory address and the shared memory size corresponding to the Handle number (Handle 1) transmitted together with the data read request message as the shared memory information. Based on the retrieved shared memory information, the shared memory unit 210 recognizes that the SPD data is stored in a 2-byte area having the head address of $FFFF0000 in the shared memory, and copies the SPD data stored in the 2-byte area having the head address of $FFFF0000 in the common address to the storage address of the SPD data in the engine application software 110.

By means of this copying operation, the SPD data in the shared memory is supplied to the engine application software 110 as shown with the left side arrow out of two arrows that extend from the frame of the shared memory 210 in FIG. 3.

Next, at the timing when the control data is to be transmitted to other ECUs 4 and 6, as shown by [7] in FIG. 8, the communication control unit 400 issues a transmission request message that is served as a transmission command to the common packet data unit 230 to generate the common packet data as exemplarily shown in the frame of the common packet data unit 230 in FIG. 3.

Though only one packet number PN is shown in FIG. 3, because there are many packet numbers actually, the communication control unit 400 also transmits the packet number PN (in this example, PN1) of the common packet data to be transmitted this time to the common packet data unit 230 with the transmission request message. In detail, the communication control unit 400 issues the transmission request message that includes PN1 every 1 second according to the packet number and the communication period defined by the data specification table shown in FIG. 5, issues the transmission request message that includes PN2 every 3 seconds, issues the transmission request message that includes PN3 every 5 seconds, and issues the transmission request message that includes PN4 every 0.5 second. The description in parentheses in FIG. 8 and FIG. 9 indicates the case that the packet number PN transmitted from the communication control unit 400 to the common packet data unit 230 is PN1.

When the communication control unit 400 issues the transmission request message that includes the packet number PN as described above, the common packet data unit 230 refers the data specification table (FIG. 5) in the table storage unit 500 and the physical value conversion table (FIG. 6) and retrieves each Handle number corresponding to the packet number PN transmitted from the communication control unit 400 (that is, each Handle number of the control data summarized in the common packet data of the packet number PN transmitted from the communication control unit 400) as the communication data information as shown by [8] in FIG. 8.

For example, in the case that the packet number PN transmitted from the communication control unit 400 to the common packet data unit 230 is PN1, because the offset and size corresponding to PN1 are 0 and 4 respectively in the data specification table shown in FIG. 5, the common packet data unit 230 retrieves Handle 1, Handle 10, Handle 5, and Handle 2 described in the rows from the top row to the 4-th row in the physical value conversion table shown in FIG. 6 as the Handle numbers of the control data that constitutes the common packet data of PN1.

Then, as shown by [9] in FIG. 8, the common packet data unit 230 transmits the first Handle number (in this example, Handle 1) out of the retrieved Handle numbers to the physical value conversion unit 220 together with the physical value conversion request message.

Upon receiving the first Handle number, the physical value conversion unit 220 transmits the Handle number supplied from the common packet data unit 230 to the shared memory unit 210 together with the data retrieval request message as shown by [10] in FIG. 8.

Upon receiving the data retrieval request message, the shared memory unit 210, refers the shared memory table (FIG. 4) in the table storage unit 500 and retrieves the shared memory address ($FFFF0000) corresponding to the Handle number (in this example, Handle 1) transmitted together with the data retrieval request message and the shared memory size (2 bytes) as the shared memory information, and then retrieves a 2-byte data (in this example, SPD data) from $FFFF0000 address of the shared memory based on the shared memory information retrieved as described above in the same manner as shown by [2] and [5] in FIG. 7. It returns the retrieved data to the physical value conversion unit 220 as a return value as shown by [11] in FIG. 8.

Upon receiving the return value, the physical value conversion unit 220 refers the physical value conversion table (FIG. 6) in the table storage unit 500 and retrieves the LSB conversion call address (S00001000) corresponding to the Handle number (Handle 1) that the physical value conversion unit 220 has transmitted to the shared memory unit 210 in [10] as shown by [12] in FIG. 8. Then, the physical value conversion unit 220 activates the LSB conversion program stored in the LSB conversion call address retrieved as described above to thereby subject the control data of Handle 1 retrieved from the shared memory in the operations [10] and [11] (that is, the control data returned from the shared memory unit 210 as the return value, in this example, 2-byte SPD data) to LSB conversion process.

Thereby, as exemplarily shown in the frame of the physical value conversion unit 220 shown in FIG. 3, the SPD data corresponding to the Handle 1 is subjected to LSB conversion, and the LSB-converted data (SPD' data) is stored in the predetermined area of the RAM assigned as the work area of the physical value conversion unit 220 together with the corresponding Handle number (Handle 1).

Then, as shown by [14] in FIG. 8, the common packet data unit 230 refers the physical value conversion table (FIG. 6) in the table storage unit 500 and retrieves the common packet data size corresponding to the Handle number (Handle 1) that the common packet data unit 230 has transmitted to the physical value conversion unit 220 in the operation [9] and the common packet data position as the common packet data information.

The common packet data unit 230 performs common packet data generation process to generate the common packet data of the packet number (in this case, PN1) transmitted from the communication control unit 400 as shown by [15] in FIG. 8.

At this time, the common packet data generation process involves a process in which the control data that the physical value conversion unit 220 has subjected to LSB conversion this time is stored in the area specified by means of the common packet data position and the common packet data size retrieved this time from the physical value conversion table in the operation described in the [14] out of the data area in the common packet data to be targeted. For example, because the common packet data position and the common packet data size corresponding to the Handle 1 are 0 and 2 bytes respectively as shown in the top row in FIG. 6, the LSB-converted data of the Handle 1 (SPD' data) H1 is stored in a 2-byte area from the 0-th byte position in the common packet data of PN1 as shown in FIG. 10A.

After completion of the LSB conversion process on the control data of the Handle 1 and the common packet data generation process, as shown by [16] in FIG. 8, the next Handle number (Handle 10) out of Handle numbers that the common packet data unit 230 has retrieved in the operation [8] is subjected to LSB conversion in the same manner as described in the operations [9] to [14]. Then, as shown by [17] in FIG. 8, the common packet data generation process is performed in the same manner as described in the operation [15]. Furthermore, as shown in operations [18] to [21] in FIG. 8, other Handle numbers (Handle 5, Handle 2) out of Handle numbers that the common packet data unit 230 has retrieved in the operation [8] are subjected to the LSB conversion process and the common packet data generation process successively in the same manner as described in the operations [9] to [14] and [15].

When the control data of all the Handle numbers corresponding to the packet number PN transmitted from the communication control unit 400 to the common packet data unit 230 is subjected to the LSB conversion and the common packet data generation process thoroughly, the generation of the common packet to be transmitted is completed.

Figure 10A:
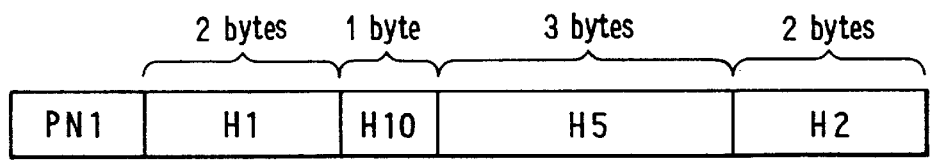
FIGS. 10A and 10B are schematic diagram showing a common packet data format generated in the process operation shown in FIG. 8.

For example, in the case that PN1 is transmitted from the communication control unit 400 to the common packet data unit 230, the common packet data of PN1 generated according to the tables shown in FIG. 5 and FIG. 6 is a data train in which the LSB-converted data Hi of the Handle 1 is stored in a 2-byte area from the 0-th byte position, the LSB-converted data H10 of the Handle 10 is stored in a 1-byte area from the second byte position, the LSB-converted data H5 of the Handle 5 is stored in a 3-byte area from the third byte position, and the LSB-converted data H2 of the Handle 2 is stored in a 2-byte area from the sixth byte position as shown in FIG. 10A.

Figure 10B:
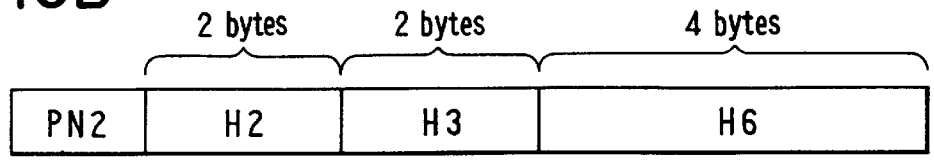

Furthermore, for example, in the case that PN2 is transmitted from the communication control unit 400 to the common packet data unit 230, the common packet data of PN2 generated according to the tables shown in FIG. 5 and FIG. 6 is a data train in which the LSB-converted data H2 of the Handle 2 is stored in a 2-byte area from the 0-th byte position, the LSB-converted data H3 of the Handle 3 is stored in a 2-byte area from the second byte position, and the LSB-converted data H6 of the Handle 6 is stored in a 4-byte area from the 4-th byte position as shown in FIG. 10B.

Next, when the generation of the common packet data to be transmitted this time is completed as described above, the common packet data unit 230, as shown by [22] in FIG. 8 and [22] in FIG. 9, issues a transmission request message to the communication data conversion unit 240 so as that the common packet data generated this time is converted to the communication data train corresponding to the communication protocol that is acceptable for the communication opponent. At this time, the packet number (in this example, PN1) of the common packet data generated this time is also transmitted to the communication data conversion unit 240.

Then in the operation [23] in FIG. 9, the communication data conversion unit 240 converts the common packet data generated this time by the common packet data unit 230 to a communication data train corresponding to the multiple communication protocol that is acceptable to other ECUs 4 and 6, which are communication opponents. In detail, in the case of the present embodiment, as exemplarily shown in the frame of the communication data conversion unit 240 in FIG. 3, Arbitration and ML served as the header information conformable to the communication protocol of the communication opponent are added to the head of the common packet data generated by the common packet data unit 230. Arbitration indicates the priority level of the data and is the arbitration data to be used when data conflict. ML is the data for indicating the data length of the data frame portion of the communication data train.

Upon completion of the generation of the communication data train, the communication data conversion unit 240 issues a transmission request message to the communication driver unit 300 as shown by [24] in FIG. 9.

Then, the multiple communication unit 310 in the communication driver unit 300 supplies the communication data train generated by the communication data conversion unit 240 and controls the communication IC so as to transmit the communication data train generated as described above to the multiple communication line 10 at the baud rate and at the transfer timing corresponding to the communication protocol of the communication opponent in the transmission process [25] in FIG. 9.

By means of the series of processes described above, the control data calculated by the application unit 100 in the microcomputer 60 is converted to the data train conformable to the communication protocol corresponding to the multiple communication line 10, and transmitted to the air conditioner ECU 4 and the meter ECU 6.

In the description, the case that the common packet data of PN1 is generated and transmitted (that is, the case that the communication control unit 400 issues the transmission request message that includes PN1 to the common packet data unit 230 in the operation [7] in FIG. 8) is described mainly. Similarly another common packet data other than PN1 is also generated and transmitted in the same manner as used for the common packet data of PN1. However, in the case of the common packet data of PN2, the process operation shown in FIG. 8 and FIG. 9 is executed every 3 seconds for generation and transmission, and for example in the case of the common packet data of PN3, the process operation shown in FIG. 8 and FIG. 9 is executed every 5 seconds for generation and transmission. The period of generation and transmission of each common packet data is determined by the packet number and the communication period listed in the data specification table shown in FIG. 5.

In the present embodiment, the shared memory set in the RAM 60c of the microcomputer 60 operate as a memory unit, and the predetermined area where the plurality of types of LSB conversion programs to be activated by the physical value conversion unit 220 out of the memory area in the ROM 60b of the microcomputer 60 operate as conversion program storage means.

The data specification table shown in FIG. 5 and the physical value conversion table shown in FIG. 6 correspond to the data table operating as the conversion information, and the area where both tables are stored in the table storage unit 500 of the ROM 60b operate as conversion information memory means.

The communication control unit 400 operates as transmission operation activation means, the physical value conversion unit 220 and the common packet data unit 230 operate as data conversion means, and the communication data conversion unit 240 and the communication driver unit 300 operate as transmission means.

Out of the common packet data unit 230, the program that involves the process shown by [8] in FIG. 8 (the process for retrieving each Handle number corresponding to the packet number supplied from the communication control unit 400 with reference to the data specification table and the physical value conversion table) operate as transmission data specification means, the physical value conversion unit 220 operate as accuracy conversion means, and out of the common packet data unit 230, the program that involves the common packet data generation process shown by [15], [17], [19] and [21] in FIG. 8 operate as packet data generation means.

Figure 11:
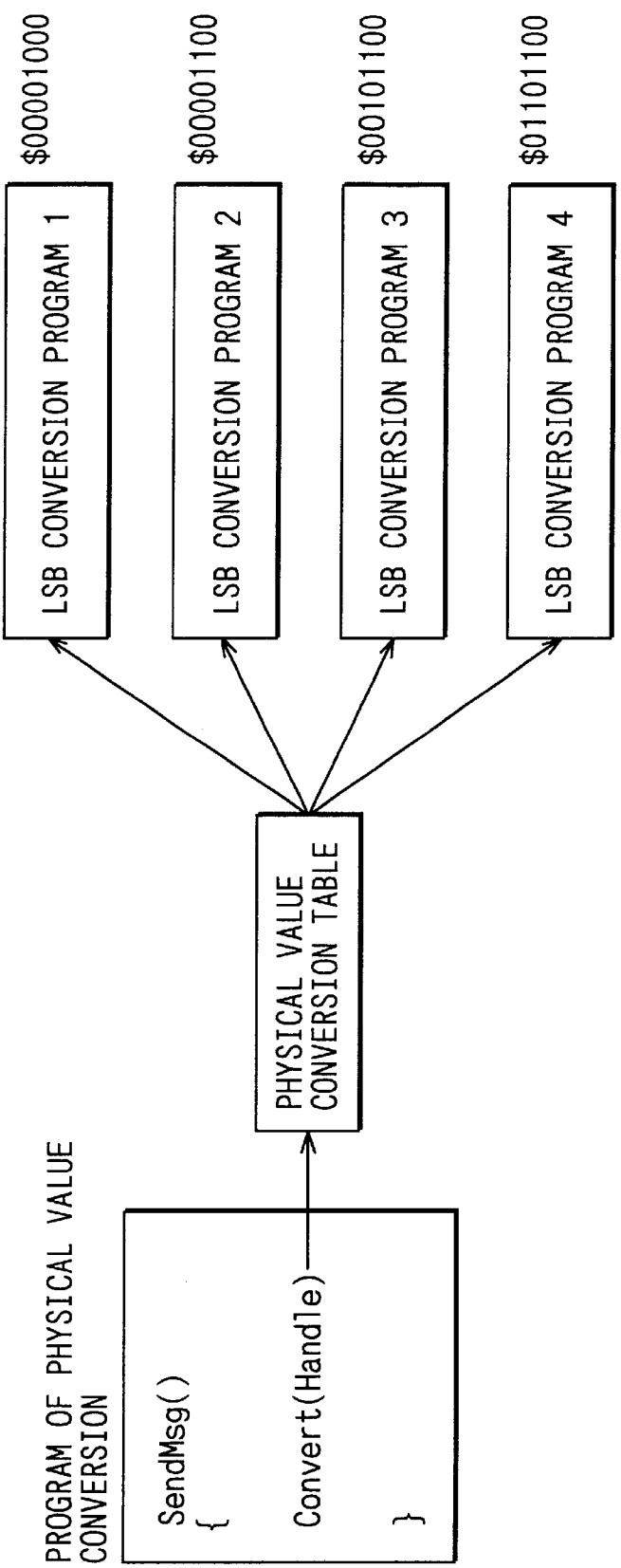
FIG. 11 is a schematic diagram showing an LSB conversion operation shown in FIG. 8.

FIG. 11 is a schematic diagram showing the LSB conversion operation enclosed in a chain line hexagonal frame shown in FIG. 8. In the microcomputer 60 provided in the engine ECU 2 of the present embodiment, as shown in FIG. 11, the head address (LSB conversion call address) of the LSB conversion program is defined corresponding to each control data to be transmitted to the communication opponent previously in the physical value conversion table, the physical value conversion unit 220 that is activated every transmission timing activates the LSB conversion program corresponding to the control data to be actually transmitted based on the information in the physical value conversion table to thereby subject the control data to LSB conversion process.

When the content of the LSB conversion corresponding to any control data is to be changed, it is not necessary to correct the whole program control statement, only the LSB conversion call address corresponding to the control data in the physical value conversion table may be rewritten. In the case that the LSB conversion with a new content is required, an LSB conversion program for conversion is added to the ROM and then the LSB conversion call address in the physical value conversion table may be changed.

In the microcomputer 60 of the present embodiment, because the control data that is the process target to be LSB-converted is subjected to LSB conversion process by activating the LSB conversion program specified based on the physical value conversion table, in the case that a plurality of control data are subjected to LSB conversion having the same content, the LSB conversion call addresses in the physical value conversion table are equalized to the same value (S00001000) as, for example, in the case of the Handle 1 in the top row and the Handle 2 in the fourth row in FIG. 6. As a result the same LSB conversion program can be applied for a plurality of control data. Thereby, not only the total capacity is reduced but also the required capacity of the ROM can be reduced.

Furthermore, according to the microcomputer 60 of the present embodiment, for example, in the case that the transmission period of the packet data of PN1 is changed from 1 second to 3 seconds, it is sufficient to change only the period at which the communication control unit 400 issues the transmission request message including PN1, it is not necessary to change not only the LSB conversion program but also any other program. Particularly, in the present embodiment, because the packet number and the communication period are defined based on the data specification table shown in FIG. 5 and the communication control unit 400 issues the transmission request message including each packet number every period based on the definition content, it is sufficient to rewrite the description content of the data specification table for changing the transmission period, and the transmission period can be changed very easily.

Furthermore, in the microcomputer 60 of the present invention, because the control data to be transmitted is LSB-converted immediately before the control data is transmitted, the control data that indicates the newest physical value is transmitted to a communication opponent always.

In addition, the LSB-converted control data is stored immediately in the data area that constitutes the packet data to be transmitted, it is not necessary to provide a memory area for storing the LSB-converted data separately, and as a result the memory capacity can be reduced.

Furthermore, in the microcomputer 60 of the present invention, the common packet data unit 230 and the physical value conversion unit 220 specify a plurality of control data to be transmitted this time from the packet number issued by the communication control unit 400 based on the data specification table and the physical value conversion table, activate the LSB conversion program corresponding to each specified control data and subject the control data to LSB conversion process, and generate the packet data to be transmitted actually from each LSB-converted control data. As a result, only by changing the correlative relation between the packet number and the Handle number in the data specification table and the physical value conversion table, the type of the control data that constitutes the packet data to be transmitted actually can be changed, this feature is additional another effect of the present invention.

The present embodiment of the present invention is described above, but the present invention is by no means limited to the embodiment, and various modifications may be applied. For example, in the automobile control system 1 of the embodiment, the number of ECUs is by no means limited to 3 and the number of ECUs may be 2 or 4 or more. Further, the above communication process among ECUs may be applied to a plurality of microcomputers provided in the same ECU.

SECOND EMBODIMENT

Figure 12:
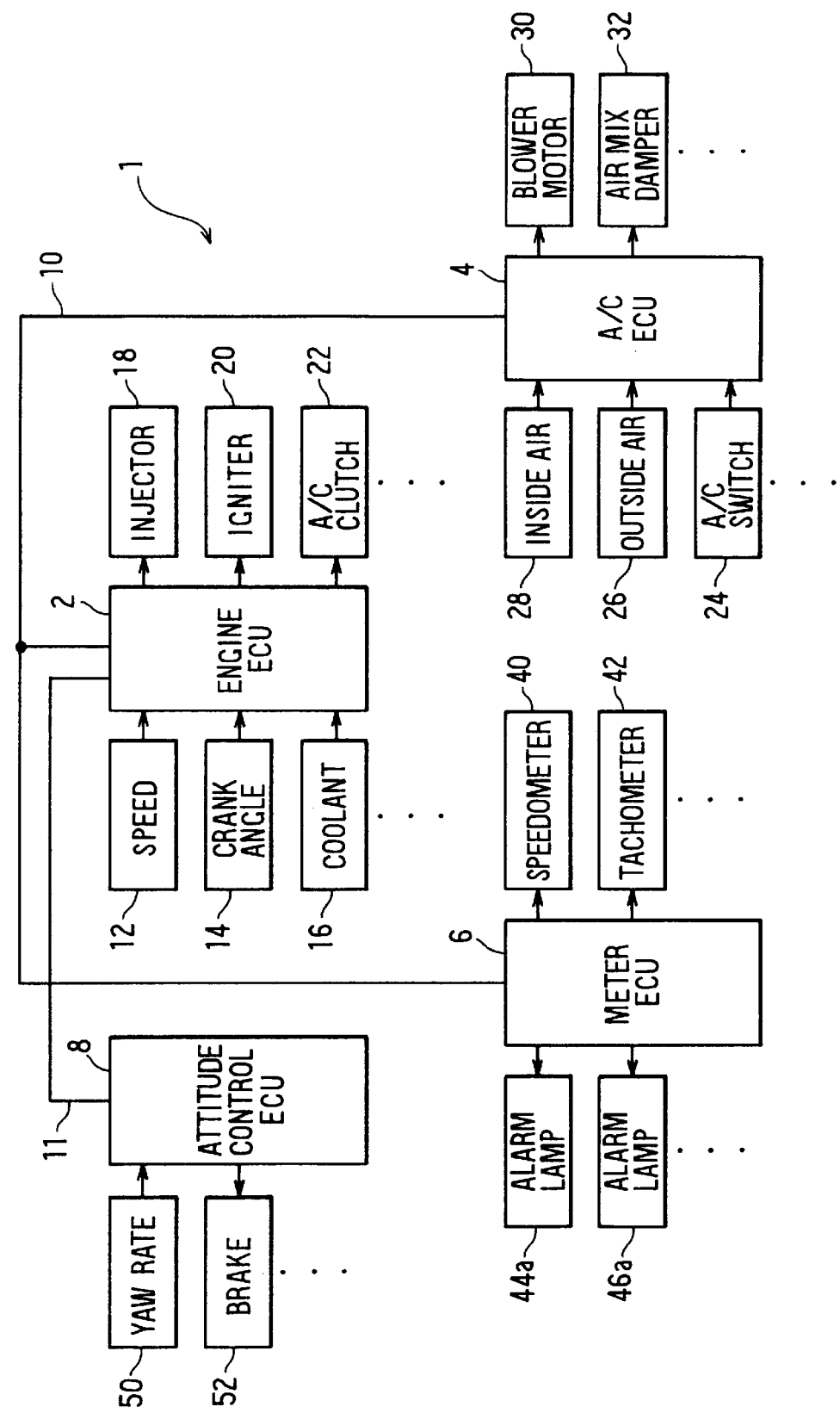
FIG. 12 is a block diagram showing an automobile control system according to a second embodiment of the present invention.

In a second embodiment, as shown in FIG. 12, the engine ECU 2 is not only connected to the ECUs 2, 4 and 6 through the multiple communication line 10, but also connected to an attitude control ECU 8 so as to do serial communication through a serial communication line 11 separate from the multiple communication line 10. The communication protocol through the multiple communication line 10 is different from the communication protocol through the serial communication line 11. The meter ECU 6 lights alarm lamps 44a and 46a for indicating the content of abnormality of each data for alarming abnormality (fail-safe data) which the engine ECU 6 transmits upon detection of abnormality.

Further, according to the present embodiment, the engine ECU 2 transmits to the meter ECU 6 an injection amount data indicative of an accumulated amount of fuel injected N-times, each time the engine ECU 2 effects fuel injection N-times (for instance, 20 times). The meter ECU 6 responsively calculates a total fuel consumption amount based on the injection amount data and displays it on a display (not shown).

On the other hand, the attitude control ECU 8 detects the running condition of the automobile based on the signal from various sensors such as a yaw rate sensor 50, and actuates a brake actuator 52 to control the brake and transmits the control data (for example, fuel cut-signal) to reduce the engine output to the engine ECU 8 through the serial communication line 11 when the attitude control ECU 8 determines the automobile to be in skidding. At that time, the engine ECU 2 actuates the injector 18 according to the control data supplied from the attitude control ECU 8 to reduce the engine output.

ECUs 2, 4, 6 and 8 are provided with respective microcomputers, each microcomputer executes a program to realize the operation of the ECUs 2, 4, 6 and 8.

Figure 13:
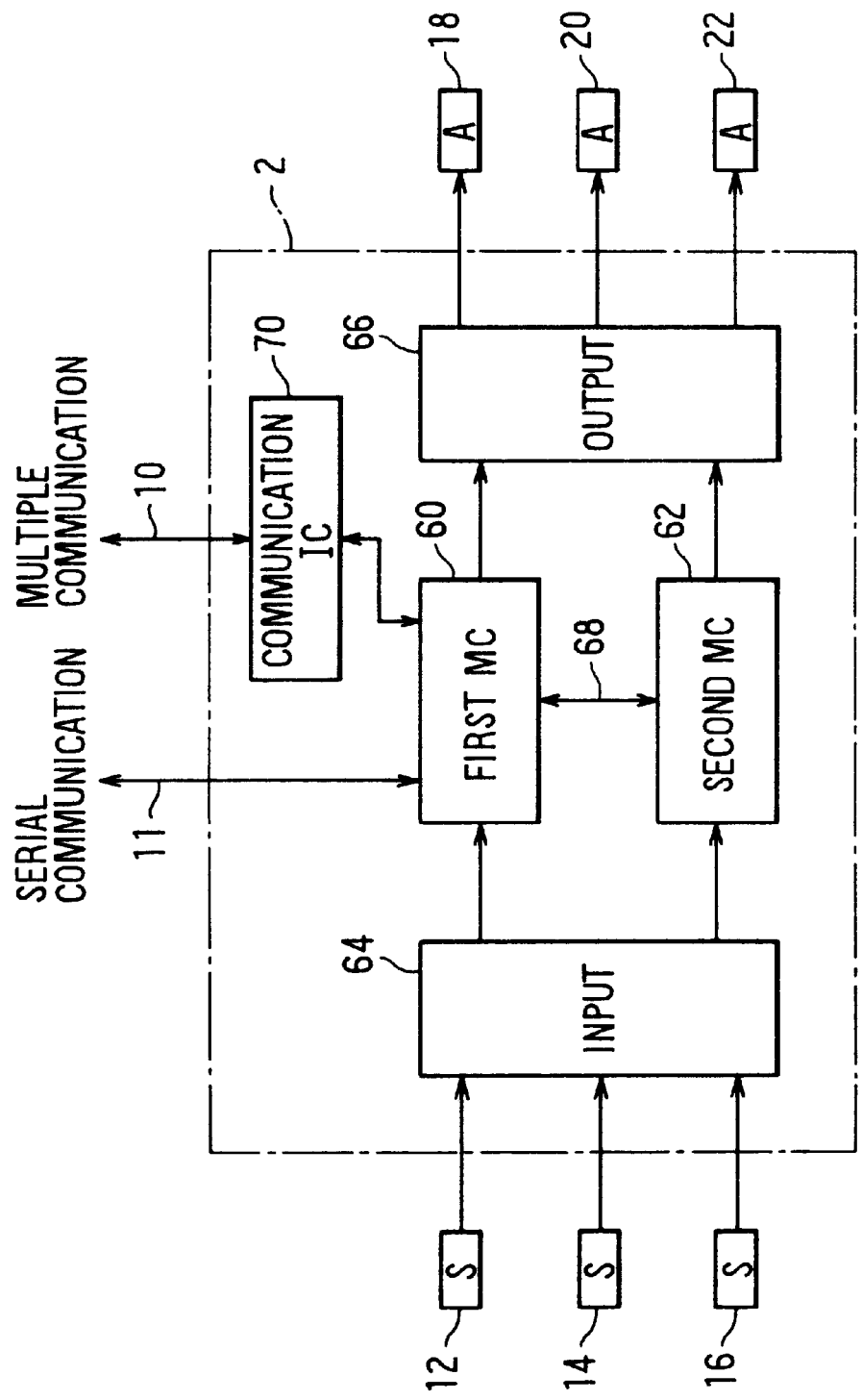
FIG. 13 a block diagram showing an engine ECU used in the second embodiment shown in FIG. 12.

As shown in FIG. 13, the engine ECU 2 is provided with two microcomputers that is a first microcomputer 60 (information processor unit) and a second microcomputer 62. The microcomputers 60 and 62 receive the signal from the various sensors 12, 14, and 16 by way of an input circuit 64, execute the arithmetic operation for controlling control targets based on the input signal, and send out the control magnitude signal to an output circuit 66 to thereby actuates various actuators such as the injector 18 and igniter 20.

The first microcomputer 60 and the second microcomputer 62 communicate the control data each other through a communication line 68 to hold the control data for controlling control targets in common. That is, the first microcomputer 60 and the second microcomputer 62 share and execute the arithmetic operation for controlling the engine and transmission, and hold the control data used individually for the arithmetic operation in common by means of communication through the communication line 68. The communication protocol communicated through this communication line 68 is DMA communication and different from the communication protocol communicated through the multiple communication line 10 and serial communication line 11.

Figure 14:
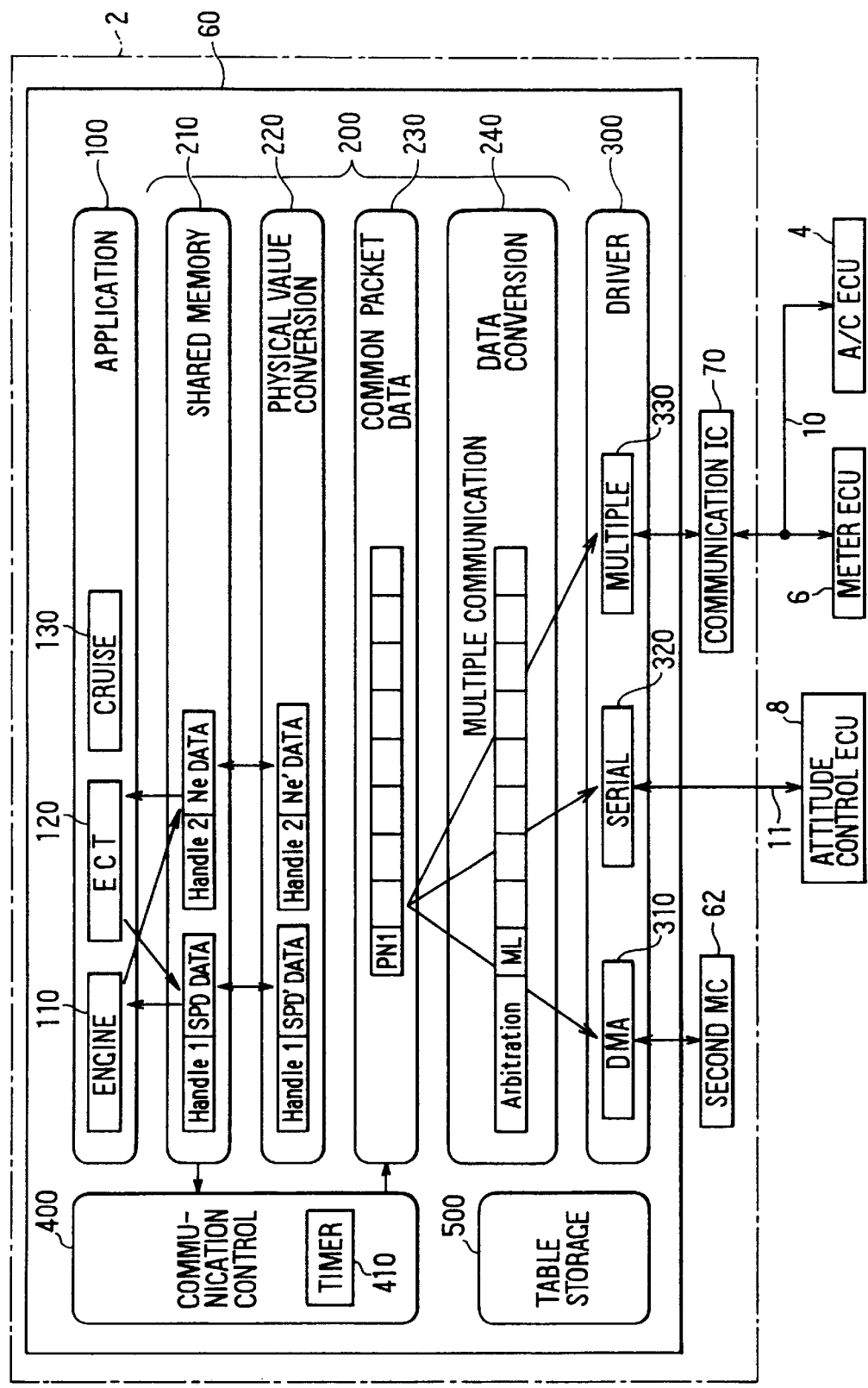
FIG. 14 is a functional diagram showing an imaginary communication model in a microcomputer provided in the engine ECU.

As shown in FIG. 14, the communication model employed in the first microcomputer 60 is similar to that shown in FIG. 3. In this embodiment, when the data is transmitted from the first microcomputer 60 to the communication opponent, the common packet data unit 230 collects and arranges in series the control data to be transmitted (transmission data after the LSB conversion) that was subjected to the LSB conversion by the physical value conversion unit 220 to thereby generate the packet data common for the communication protocols that is independent of the communication protocols such as multiple communication, serial communication, or DMA communication. This packet data is referred to as common packet data below, when it is distinguished from the packet data which is transmitted and received actually on the transmission line. A packet number PN is given as an identification number to each common packet.

When the data is transmitted from the microcomputer 60 to the communication opponent, the communication data conversion unit 240 converts the common packet data generated by the common packet data unit 230 to a communication data train (that is, packet data actually transmitted) corresponding to the communication protocol of the communication opponent. In detail, it adds header information or the like in conformity with the communication protocol to the data train of the common packet data. Further, if the data length of the common packet data is longer than the maximum transfer unit (unit of transfer which can be transmitted each time) determined in relation to the communication protocol of the communication opponent, the communication data conversion unit 240 divides it into the data length within the maximum transfer unit.

The communication driver unit 300, when the data is transmitted from the microcomputer 60 to the communication opponent, sends out the communication data train generated by the communication data conversion unit 240 as the communication data actually at the transfer data quantity, baud rate, and transfer timing determined according to the communication protocol with the communication opponent. The communication driver unit 300 is provided with a DMA communication unit 310 for controlling DMA communication with the second microcomputer 62, a serial communication unit 320 for controlling serial communication with the attitude control ECU 8, and a multiple communication unit 330 for controlling multiple communication with the air conditioner ECU 4 and the meter ECU 6, in correspondence with each communication protocol of the communication opponent.

The communication control unit 400 is provided with an internal timer 410 for counting time. It determines, based on the count value of the timer 410, the timing for performing the communication data train generation so that the communication with the second microcomputer 62 and other ECUs 4, 6 and 8 is performed at the suitable timing. The communication control unit 400 has a function of activating generation of the communication data train in response to a transmission request of event transmission from the shared memory unit 210.

The communication driver unit 300 (DMA communication unit 310, serial communication unit 320 and multiple communication unit 330) receives and retrieves the data transmitted from the communication opponent (second microcomputer 62, and other ECUs 4, 6 and 8), and supplies the data to the communication data conversion unit 240.

The table storage unit 500 stores a shared memory table shown in FIG. 4, and has a first and a second data tables (Handle number specification table and packet number specification table) shown in FIGS. 15A and 15B.

As shown in FIG. 15A, the Handle number specification table is a data table that lists the transmission period at which the common packet data of the packet number is to be transmitted, the Handle number of each control data that constitutes the common packet data of the packet signal, the communication system by means of which the common packet data of the packet number is communicated, and the header information to be added when the common packet data of the packet number is communicated by means of the communication protocol of the communication system.

In FIG. 15A, "E" listed in the column of Handle number is the data for indicating that there is no data for indicating the Handle number in the following. "CAN" listed in the column of the communication system indicates the communication protocol of multiple communication, and "SCI" indicates the communication protocol of serial communication.

As shown in FIG. 15B, the packet number specification table is a data table that lists, for each Handle number of the control data, the common packet data position for indicating the location position of the control data of the Handle number in the common packet data, the common packet data size for indicating the data length of the control data of the Handle number in the common packet data, the event transmission packet number that is the packet number of the common packet data to be event-transmitted containing the data of the Handle number as the component, and the LSB conversion call address that is the storage position information for indicating the head address in the ROM of the stored LSB conversion program used for subjecting the data of the Handle number to LSB conversion process.

The common packet data position indicates the head byte position of the control data of the corresponding Handle number in the common packet data, wherein the first 1 byte is denoted by 0-th byte in the common packet data. In the present embodiment, the common packet data position and the common packet data size are the location position information.

Each object can retrieve the information, for example, the information that the control data of what Handle number is summarized in the common packet data PN1, required to generate the communication data train by referring to the data tables shown in FIGS. 15A and 15B.

Figure 16:
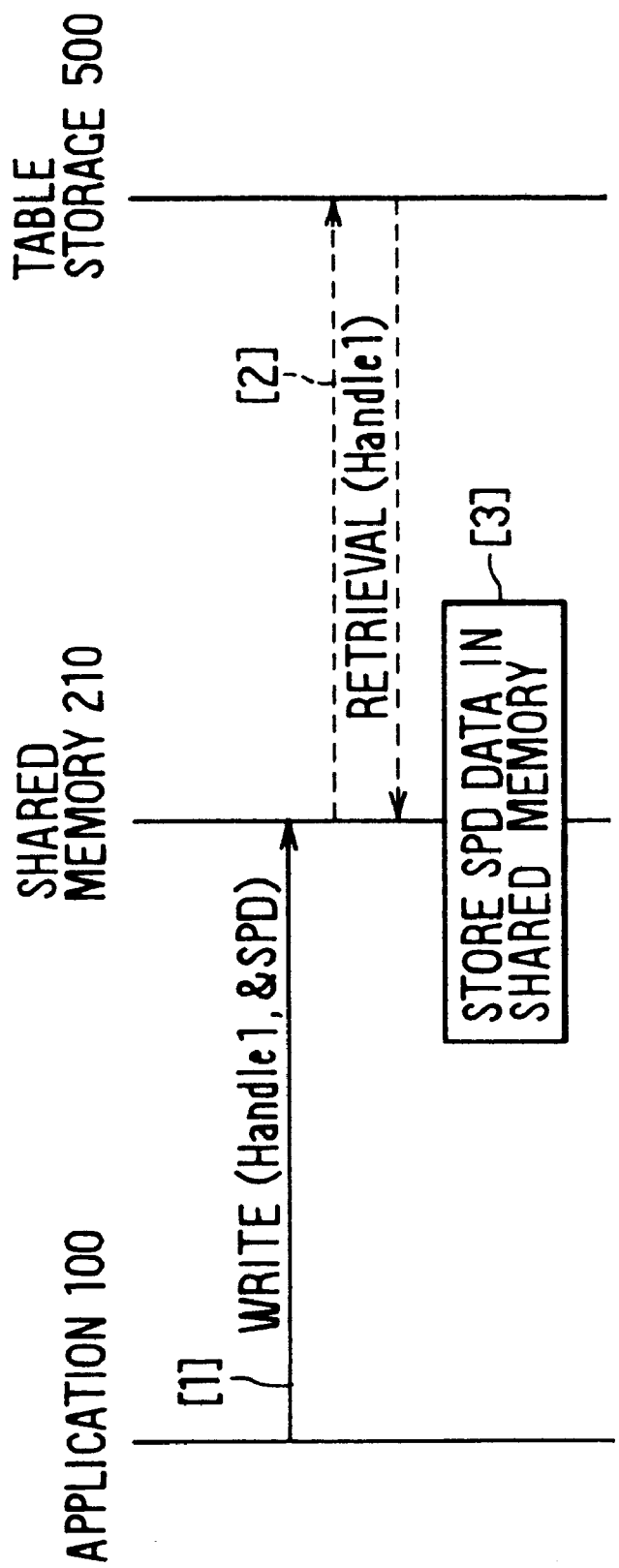
FIG. 16 is a message sequence diagram showing process operation for storing control data obtained by an application unit in a shared memory.
Figure 17:
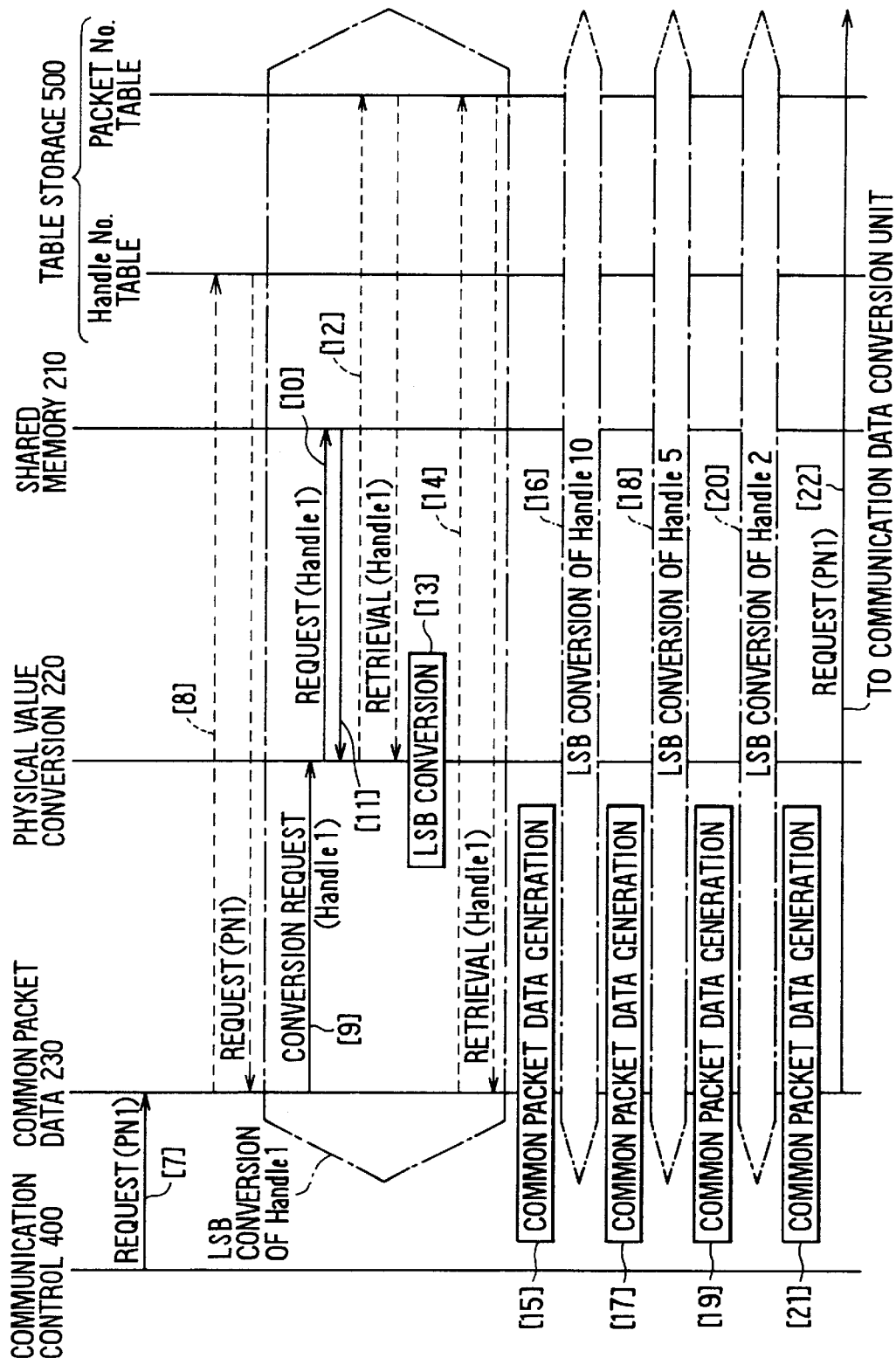
FIG. 17 is a message sequence diagram showing process operation for generating common packet data from the control data stored in the shared memory in a regular transmission.
Figure 18:
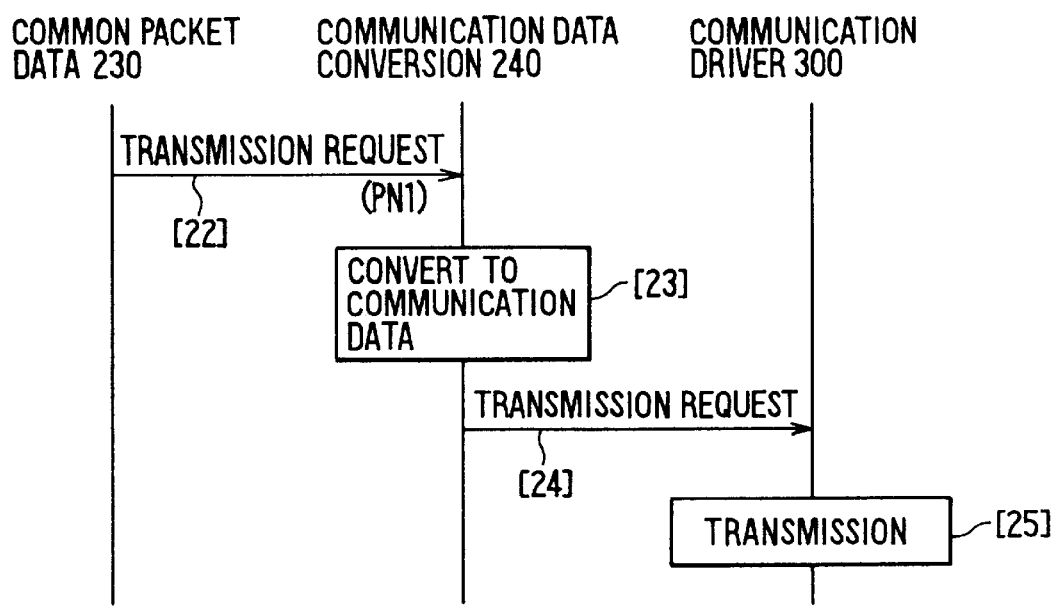
FIG. 18 is a message sequence diagram showing a process operation for generating common packet data from the control data stored in the shared memory.
Figure 20A:
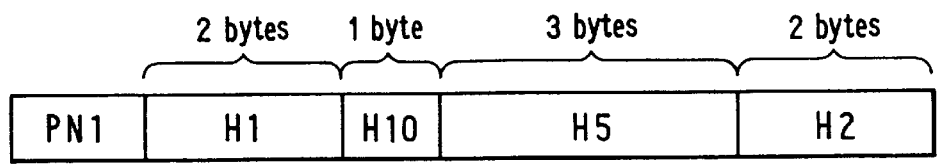
FIGS. 20A and 20B are schematic diagrams showing the common packet data generated by means of process operation shown in FIG. 17 and FIG. 18, respectively.
Figure 20B:
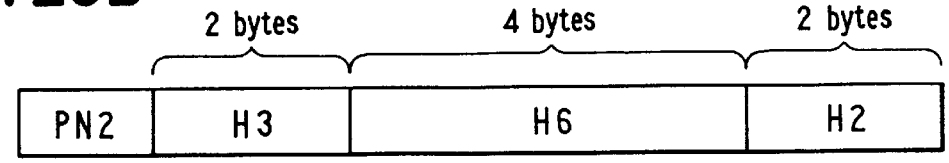
Figure 19:
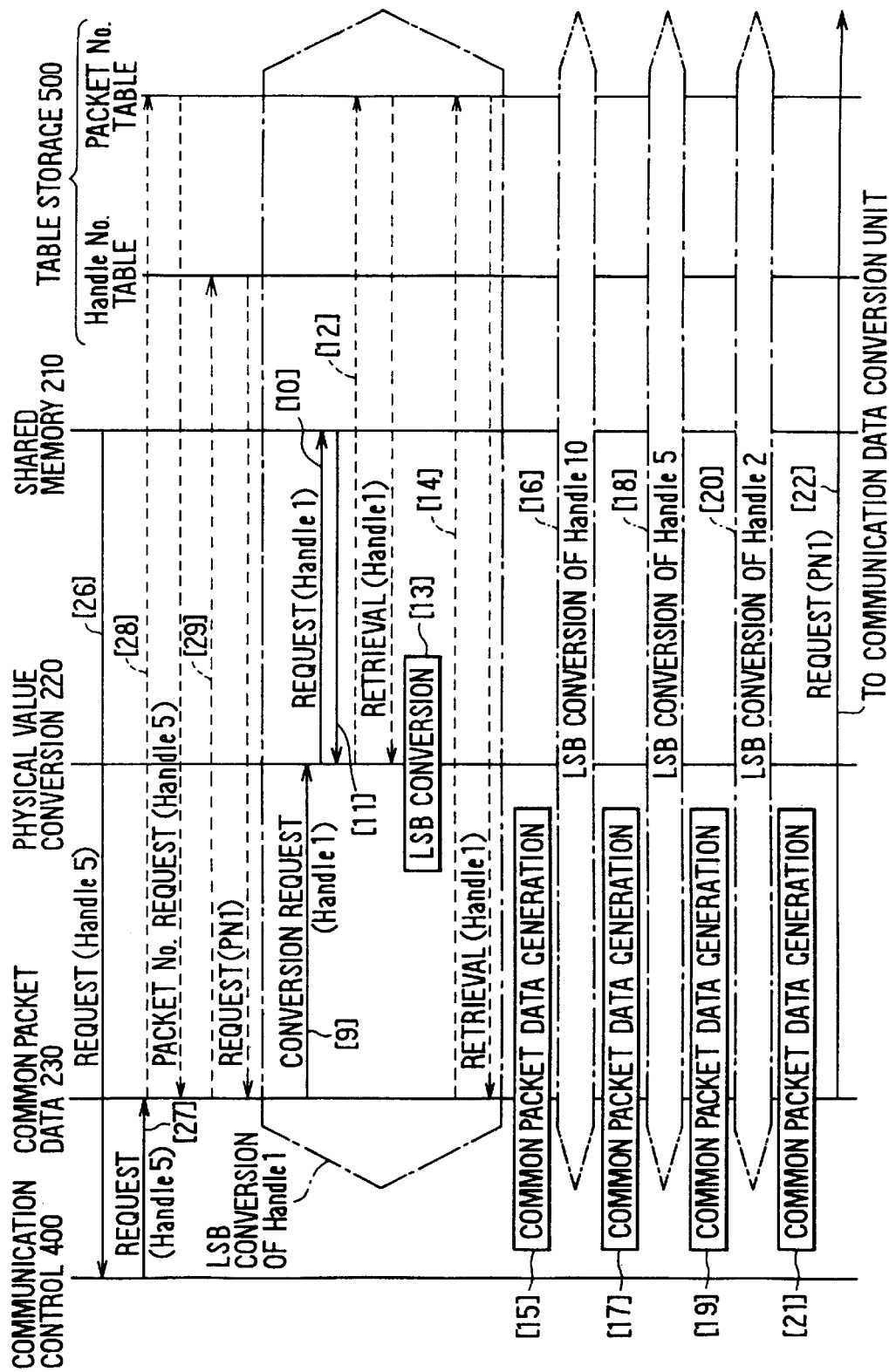
FIG. 19 is a message sequence diagram showing process operation for generating the common packet data from the control data stored in the shared memory in an event transmission.
Figure 21:
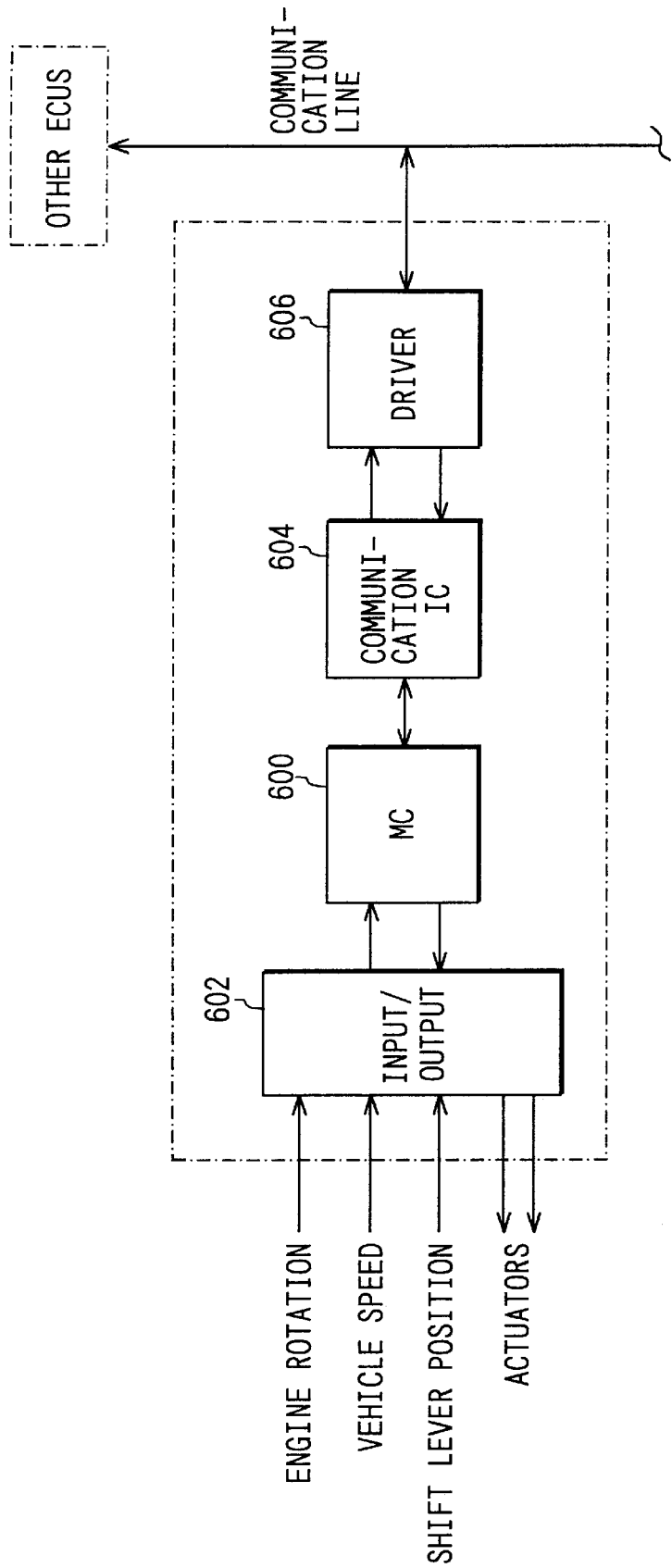
FIG. 21 is a block diagram showing a conventional automobile control system.

Next, the conversion process for converting to the communication data train performed when the control data is transmitted from the first microcomputer 60 to the outside is described with reference to FIG. 16 to FIG. 20. The operation process in FIG. 16 to FIG. 18 is similar to the operation process in FIG. 7 to FIG. 9. It is to be noted that FIG. 17 and FIG. 19 are similar to each other, FIG. 17 shows a process executed every predetermined time for a regular transmission and FIG. 19 shows a process executed at updating of the control data to be transmitted in an event transmission. The process shown in FIGS. 16 to FIG. 18 is performed in the same manner as in the first embodiment (FIG. 7 to FIG. 9).

However, in the case that the packet number transmitted from the common packet data unit 230 to the communication data conversion unit 240 is PN1, the communication data conversion unit 240 first retrieves and retrieves the communication system and header information listed in correspondence with PN1 from the Handle number specification table shown in FIG. 15A. In this case, because the communication system is "CAN" that indicates multiple communication and the header information is "Arbitration= 0×123" and "ML=08", the communication data conversion unit 240 adds the content of Arbitration and ML retrieved from the Handle number specification table to the head of the common packet data generated by the common packet data unit 230 as exemplarily shown in the frame of the data conversion unit 240 in FIG. 14 to thereby generate the communication data train corresponding to CAN. Arbitration indicates the priority order of the data and an arbitrary data to be used when the data conflicts. Arbitration=0×123 means that Arbitration is 123 in the hexadecimal expression. ML is the data that indicates the data length of the data frame portion in a communication data train, and "ML=08" means that the data length is 8 bytes.

Upon completion of generation of the communication data train, the communication data conversion unit 240, as shown by [24] in FIG. 18, issues a transmission request message to the object corresponding to the communication system (that is, the communication protocol of the generated communication data train) retrieved from the Handle number specification table in the process [23] selectively from among the DMA communication unit 310, serial communication unit 320, and multiple communication unit 330 in the communication driver unit 300.

Then, the object in the communication driver unit 300 (any one of the DMA communication unit 310, serial communication unit 320, and multiple communication unit 330), that is the addressee of the message transmitted from the communication data conversion unit 240, sends out the communication data train generated by the communication conversion unit 240 to the communication opponent as an actual communication data at the baud rate and transfer timing corresponding to the communication protocol of itself.

For example, in the case that the communication system retrieved from the Handle number specification table in the process [23] is CAN, the transmission request message is issued to the multiple communication unit 330 of the communication driver unit 300.

Then, the multiple communication unit 330 sends out the communication data train generated by the communication data conversion unit 240 to the communication IC 70 in the transmission process in [25] in FIG. 18, and controls the communication IC 70 so as to send out the communication data train generated as described above to the multiple communication line 10 at the baud rate and transfer timing corresponding to the communication protocol of the communication opponent. Through a series of processes, the control data calculated by the application unit 100 in the microcomputer 60 is converted to the packet data of the communication protocol corresponding to the multiple communication line 10, and the converted control data is transmitted to the air conditioner ECU 4 and meter ECU 6.

A case in which the packet data PN1 is generated and transmitted is described mainly above, the packet data other than PN1 is also generated and transmitted in the same manner as used for the packet data PN1.

However, for example, in the case of the packet data PN2, the process operation shown in FIG. 17 and FIG. 18 is carried out every 3 seconds for generation and transmission, and in the case of the packet data PN3, the process operation shown in FIG. 7 and FIG. 8 is carried out every 5 seconds for generation and transmission. The period for generating and transmitting each packet data is determined by the packet number and transmission period listed in the Handle number specification table shown in FIG. 15A.

Furthermore, for example, as shown in FIG. 15A, in the case of the common packet data of PN2, because the communication system is "SCI" that indicates the serial communication and the header information is "ID=1" and "ML=16", ID and ML are added to the head as the header information and converted to the packet data to be transmitted actually. In the case that the packet data of PN2 is generated and transmitted, because the communication data conversion unit 240 sends out the transmission request message to the serial communication unit 320 of the communication driver unit 300 in the [24], the generated packet data of PN2 is sent out to the serial communication line 11 by the serial communication unit 230 in the communication driver unit 300.

Next, the process for generating a common packet data in the event transmission will be described with reference to FIG. 19.

First, the shared memory unit 210 detects that an event transmission target data (for example, the fail-safe data or the injection quantity data of every N-times injection) to be event-transmitted to the communication opponent, that is selected from among the data in the shared memory, is updated, and then sends out a transmission request message including the Handle number of the updated data to the communication control unit 400 as shown by [26] in FIG. 9.

The shared memory unit 210 determines that the data is updated according to the sequence shown in FIG. 6 in response to the data write request from the application unit 100 when the event transmission target data is written in the shared memory or when the data value is changed from the original value concomitantly with writing of the event transmission target data in the shared memory. The description in the parentheses shown in FIG. 9 exemplarily indicates a case that the Handle number sent out from the shared memory unit 210 to the communication control unit 400 is the Handle 5.

Then, the communication control unit 400 sends out a transmission request message including the Handle number sent out from the shared memory unit 210 as a transmission command to the common packet data unit 230 as shown by [27] in FIG. 9 so as to generate the common packet data including the data of the Handle number sent out from the shared memory unit 210 (that is the updated event transmission target data). That is, in the event transmission, the communication control unit 400 sends out the Handle number that indicates the updated event transmission target data, instead of the packet number, as a transmission command.

When the communication control unit 400 sends out the transmission request message including the Handle number as described above, the common packet data unit 230, as shown by [28] in FIG. 19, retrieves and retrieves the event transmission packet number (that is, the packet number of the common packet number to be event-transmitted including the data of the Handle number sent out from the communication control unit 400 as the component) listed corresponding to the Handle number sent out by the communication control unit 400 from the packet number specification table (FIG. 15B) in the table storage unit 500 as shown by [28] in FIG. 19 as the packet number of the common packet data to be event-transmitted this time.

For example, in the case that the Handle number sent out from the communication control unit 400 to the common packet data unit 230 is the Handle 5, because the packet number listed corresponding to the Handle 5 in the packet number specification table shown in FIG. 15B is PN1, the PN1 is retrieved as the packet number of the packet data to be event-transmitted this time.

The common packet data unit 230, in [29] in FIG. 19, retrieves and retrieves each Handle number (each Handle number of the data that constitutes the common packet data to be event-transmitted this time) listed corresponding to the packet number retrieved in the [28] process from the Handle number specification table (FIG. 15A) in the table storage unit 500 in the same manner as shown by [8] in FIG. 17. For example, in the case that the packet number retrieved in the [28] process is PN1, the Handle 1, Handle 10, Handle 5, and Handle 2 listed corresponding to PN1 in the Handle number specification table shown in FIG. 15A are retrieved as each Handle number of the data that constitutes the common packet data of PN1 to be event-transmitted this time.

After that, the common packet data unit 230 generates the common packet data in the same manner as described in [9] to [21] in FIG. 17 for regular transmission as shown by [9] to [21] in FIG. 19 in cooperation with the physical value conversion unit 220 and the shared memory unit 210. In detail, the data of each Handle number retrieved in the [29] process is retrieved from the shared memory, the LSB conversion programs corresponding to retrieved each data are activated based on the packet number specification data table shown in FIG. 15B, and the LSB conversion process is performed. The LSB-converted data are arranged based on the common packet data position and the common packet data size listed in the packet number specification data table shown in FIG. 15B to thereby generate the common packet data of the packet number retrieved in the [28] process that includes the updated event transmission target data.

Upon completion of the common packet data generation, the common packet data unit 230, in [22] in FIG. 19, issues a transmission request message that includes the packet number of the common packet data generated this time to the communication data conversion unit 240 in the same manner as described in [22] in FIG. 17.

Then, the common packet data generated by the common packet data unit 230 is converted to a communication data train (packet data to be transmitted actually) corresponding to the communication protocol of the communication opponent in the same manner as shown in FIG. 18 described above by the communication data conversion unit 240 and communication driver unit 300, and then transmitted to the communication opponent.

Because two packet numbers PN1 and PN4 are listed as the event transmission packet number for, for example, Handle 1 in the packet number specification table shown in FIG. 15B, in the case that the shared memory unit 210 issues a transmission request message that includes the Handle 1 in [26] in FIG. 19 (that is, the case in which the data of the Handle 1 is to be event-transmitted), both PN1 and PN4 are subjected to the process operation described in [29] and [9] to [22] in FIG. 19 and FIG. 18. Two packet data of PN1 and PN4 are generated and transmitted.

In the packet number specification table shown in FIG. 15B, no event transmission packet number is listed for the data that does not need the event transmission (For example, data of Handle 3 and Handle 6 in FIG. 5B). Accordingly, if the shared memory unit 210 issues a transmission request message that includes the Handle number that does not need the event transmission (Handle 3 or Handle 6) in [26] in FIG. 19, a common packet data is not generated and not event-transmitted.

On the other hand, the data of the Handle 5 is included in two packet data of PN1 and PN3, but in the present embodiment, because the packet data of PN3 is a packet data to be serial-transmitted to the attitude control ECU 8 and it is therefore not necessary to event-transmit the packet data of PN3 to the attitude control ECU 8 (the event transmission is not necessary in view of the specification of the attitude control ECU 8), only PN1 is listed and PN3 is not listed in the packet number specification table shown in FIG. 15B as the event transmission packet number corresponding to the Handle 5.

In the second embodiment, the shared memory provided in the RAM of the microcomputer 60 operates as the memory unit. A portion in the communication control unit 400 that involves the process operation shown by [7] in FIG. 17 (that is, process operation for issuing each packet number listed in the Handle number specification table every transmission period listed in the table corresponding to the packet number as a transmission command) operates as regular transmission operation activation means.

A portion that involves the process operation described in [8] to [22] in FIG. 17 of the common packet data unit 230, the physical value conversion unit 220, and the shared memory unit 210 operates as regular transmission packet data generation means. A portion that involves the process operation described in [26] and [27] in FIG. 19 (that is, the process operation for issuing the Handle number of the data as a transmission command when update of the specified data in the shared memory is detected) of the shared memory unit 210 and the communication control unit 400 operates as event transmission operation activation means. A portion that involves the process operation described in [28] and [29] and [9] to [22] in FIG. 19 of the common packet data unit 230, the physical value conversion unit 220, and the shared memory unit 210 operates as event transmission packet data generation means.

The communication data conversion unit 240 and the communication driver unit 300 operate as transmission means. The predetermined area that stores a plurality of types of LSB conversion programs to be activated by the physical value conversion unit 220 in the memory area of the ROM of the microcomputer 60 corresponds to the conversion program storage means.

As described above, in the microcomputer 60 provided in the engine ECU 2, first the communication control unit 400 specifies the packet number of the packet data to be transmitted this time for the regular transmission. Then, the Handle number of each data that constitutes the packet data of the packet number is retrieved from the Handle number specification table and the data of each Handle number is retrieved from the shared memory, at that time, because the Handle number of each data that constitutes the packet data of the packet number is indicated for each packet number, the Handle number of each data that constitutes the packet data to be transmitted this time can be retrieved immediately without a long time retrieval process.

Furthermore, in the microcomputer 60, the information that are specific to each data such as the common packet data position, the common packet data size, and the LSB conversion call address, that are corresponding respectively to the retrieved Handle numbers, is retrieved, the data retrieved from the shared memory are arranged by means of the LSB conversion based on the retrieved information to thereby generate the packet data to be transmitted this time, at that time, because the information specific to each data (common packet data position, the common packet data size, and the LSB conversion call address) is described for the Handle number of each data in the packet number specification data table, the regular transmission packet data can be generated quickly without a long time retrieval process.

On the other hand, in the microcomputer 60, in the event transmission, first the shared memory unit 210 specifies the Handle number of the data to be transmitted this time. Then, the packet number of the packet data that includes the Handle number is retrieved from the packet number specification table, at that time, because the packet number of the packet data that includes the data as the component is listed in the packet number specification table for the Handle number of each data, the packet number of the packet data that includes the data to be event-transmitted this time can be retrieved immediately without a long time retrieval process.

In the microcomputer 60, the packet data to be event-transmitted this time is generated in the same manner as used for the regular transmission based on the packet number retrieved from the packet number specification table. At that time, not only the Handle number of each data that constitutes the packet data to be event-transmitted this time can be retrieved immediately from the Handle number specification table but also the information specific to each data can be retrieved immediately from the packet number specification table, and the event transmission packet data can be generated quickly.

In the microcomputer 60 provided in the engine ECU 2, the data map for defining the information used for generating the packet data is divided into the Handle number specification table and the packet number specification table, in the Handle number specification table the Handle number of each data that constitutes the packet data of the packet number is listed for each packet number, and in the packet number specification table the common packet data position and the common packet data size that indicate that the position where the data of the Handle number is located, the LSB conversion call address for LSB-converting the data of the Handle number, and the packet number of the packet data that includes the data of the Handle number as the component are listed in the packet number specification table for every Handle number of the data, as a result the packet data that is required to be transmitted immediately can be generated quickly in any transmission of the regular transmission and the event transmission.

Furthermore according to the microcomputer 60 of the present embodiment, because the packet data to be transmitted actually can be generated quickly every time, it is not necessary to generate beforehand periodically the packet data that is likely to be transmitted unlike the conventional system, and there is no redundant process and memory area. In other words, in the case of both regular transmission and event transmission, the packet data to be transmitted can be generated quickly and efficiently.

Furthermore, in the case that type or arrangement of the data that constitutes the packet data is changed, it is not necessary to correct the program control statement itself. In detail, the type change is accommodated only by rewriting the Handle number listed for every packet number in the Handle number specification table, and the arrangement change is accommodated only by rewriting the common packet data position and the common packet data size listed for every Handle number in the packet number specification table.

In the case of the packet data that does not need the event transmission though the packet data includes the same Handle number, the packet number is not listed in the packet number specification table. In detail, the data of the Handle 5 included in two packet data PN1 and PN3 is transmitted as shown in FIG. 15A, because the packet number listed corresponding to the Handle 5 is only PN1 in the packet number specification table, when the data of the Handle 5 is updated and transmitted, the packet data of PN3 will not be generated. In other words, according to the microcomputer 60 of the present embodiment, only by changing the packet number listed for each Handle number in the packet number specification table, the packet data to be event-transmitted can be changed.

Furthermore, according to the microcomputer 60 of the present embodiment, in the case that the regular transmission time interval (transmission period) of any packet data is to be changed, only the transmission period listed corresponding to the packet number of the packet data in the Handle number specification table may be changed, it is accommodated very easily.

In the microcomputer 60 of the present embodiment, because the each data to be transmitted is subjected to LSB conversion process in the physical value conversion unit 220 that is provided separately from the application unit 100, it is not necessary for application software 110 to 130 to be conscious of the data accuracy adopted by the communication opponent side, and the application software 110 to 130 are independent of the communication opponent. As a result, the replacement of application software and diversion to another system structure are easy.

Furthermore, according to the microcomputer 60 of the present embodiment, in the case that the content of LSB conversion for any data is to be changed, it is not necessary to revise or correct the program control statement itself, it is accommodated by only rewriting the LSB conversion call address that is listed corresponding to the Handle number of the data in the packet number specification table. In the case that LSB conversion that involves a new content is required, the LSB conversion program for performing the conversion is added to the ROM, and the LSB conversion call address in the packet number specification table may be changed.

In the microcomputer 60 of the present embodiment, because the data is subjected to LSB accuracy conversion process by activating the LSB conversion program specified based on the packet number specification table for the data to be LSB-converted, in the case that a plurality of types of data to be subjected to LSB conversion that has the same content are involved, for example as the Handle 1 in the first row and the Handle 2 in the second row shown in FIG. 15B, by equalizing the LSB conversion call address in the packet number specification table to the same value ($00001000), the same LSB conversion program can be applied to a plurality of data. Thus, the total capacity for the program (also the required capacity of the ROM) can be reduced.

The second embodiment may also be modified in various ways. For example, the communication system and header information for each packet number may be defined by another data map. However, the method in which both communication system and header information are defined by the Handle number specification table collectively as in the embodiment is more effective. In the case that the information is communicated only through the multiple communication line 10, the DMA communication unit 310 and the serial communication unit 320 of the communication driver unit 300 may be omitted.

What is claimed is:

1. An automobile control system comprising:
a control target mounted on an automobile; and
an information processing unit including a memory unit, the information processing unit being for performing arithmetic process for controlling the control target, storing control data calculated in the arithmetic process in the memory unit, subjecting the stored control data to a predetermined process and transmitting the processed control data to a communication opponent,
wherein the information processing unit includes at least one of an accuracy conversion unit subjecting a physical value of the control data to be transmitted among the stored data to an accuracy conversion process to produce converted data to be transmitted to the communication opponent, the accuracy conversion process converting the control data having a first resolution to the converted data having a second resolution, and a packet data generation unit for rearranging the control data among the stored data to generate a packet data to be communicated to the communication opponent,
wherein the accuracy conversion unit includes conversion program storage means storing a plurality of types of conversion programs for subjecting the control data to the accuracy conversion process, conversion information memory means storing conversion information that defines a correlative relation between each of the control data and each of the conversion programs, and data conversion means for converting the control data to the converted data by specifying one of the conversion programs stored in correspondence with the second data based on the stored conversion information, and
wherein the packet data generation means includes a first table storing information of the control data used to generate each of the packet data, a second table storing position information of each of the control data in each of the packet data, and determination means for determining the control data to be used to generate the packet data and the position of the control data to be used in the packet data by referring to the first table and the second table.

2. An automobile control system as in claim 1, wherein:
the information processing unit further includes
transmission operation activation means for issuing a transmission command that indicates the control data to be transmitted this time to the communication opponent at a predetermined transmission timing; and
transmission means for transmitting the converted data to the communication opponent after the data conversion means has completed the accuracy conversion process.

3. An automobile control system as in claim 2, wherein:
the conversion information memory means stores a data table that correlates type information of each of the control data to be transmitted to the communication opponent to storage position information for indicating a storage position in the conversion program storage means where the conversion program that is to be used for subjecting the control data indicated by the type information to the accuracy conversion process is stored as the conversion information; and
the data conversion means retrieves the storage position information corresponding to the type information of the control data indicated by the transmission command from the data table, activates the conversion program stored at the storage position indicated by the retrieved storage position information to process the control data retrieved from the memory unit, and thereby subjects the control data indicated by the transmission command to the accuracy conversion process.

4. An automobile control system as in claim 2, wherein:
the conversion information memory means stores the data table that defines correlatively an identification number of the packet data, the type information of each of the control data that constitutes the packet data having an identification number, and the storage position information for indicating the storage position of the conversion program, which is to be used for subjecting the control data indicated by the type information to the accuracy conversion process, in the conversion program storage means as the conversion information;

the transmission operation activation means issues the identification number of the packet data to be transmitted this time to the communication opponent as the transmission command;

the data conversion means includes, transmission data specification means for retrieving the type information of each control data corresponding to the issued identification number from the data table when the transmission operation activation means issues the identification number as the transmission command, and accuracy conversion means that retrieves the control data corresponding to each the type information retrieved by the transmission data specification means, retrieves the storage position information corresponding to the type information from the data table, and activates the conversion program stored at the storage position indicated by the retrieved storage position information to thereby subject the control data of each identification information retrieved from the memory unit to the accuracy conversion process.

5. An automobile control system as in claim 1, wherein:

the first data table stores a type number of each of the control data for each packet number that is an identification number of the packet data; and the second data table stores, in addition to the location position information, the packet number of the packet data that includes the control data for each type number of the control data.

6. An automobile control system as in claim 1, wherein:

the conversion information memory means further stores a position and data size of the control data in the packet data with respect to each of the control data.

7. An automobile control system as in claim 1, wherein:

the first table further stores a period of transmission and a communication system to be used with respect to each of the packet data; and the second table further stores a data size of each of the control data in the packet data and an identification of the packet data in which to be used with respect to each of the control data.

8. An automobile control system comprising:

a control target mounted on an automobile; and an information processing unit including a memory unit, the information processing unit being for performing arithmetic process for controlling the control target, storing control data calculated in the arithmetic process in the memory unit, subjecting the stored control data to a predetermined process and transmitting the processed control data to a communication opponent, wherein the information processing unit includes at least one of an accuracy conversion unit subjecting a physical value of the control data to be transmitted among the stored data to an accuracy conversion process to produce converted data to be transmitted to the communication opponent, the control data having a first resolution and the converted data having a second resolution, and a packet data generation unit for rearranging the control data among the stored data to generate a packet data to be communicated to the communication opponent, wherein:

the accuracy conversion unit includes conversion program storage means storing a plurality of types of conversion programs for subjecting the control data to the accuracy conversion process, conversion information memory means storing conversion information that defines a correlative relation between each of the control data and each of the conversion programs, and data conversion means for converting the control data to the converted data by specifying one of the conversion programs stored in correspondence with the second data based on the stored conversion information, the packet data generation means includes a first table storing information of the control data used to generate each of the packet data, a second table storing position information of each of the control data in each of the packet data, and determination means for determining the control data to be used to generate the packet data and the position of the control data to be used in the packet data by referring to the first table and the second table;

the first data table stores a type number of each of the control data for each packet number that is an identification number of the packet data;

the second data table stores, in addition to the location position information, the packet number of the packet data that includes the control data for each type number of the control data;

the information processing means includes regular transmission operation activation means that issues the packet number of the packet data to be transmitted this time to the communication opponent every predetermined transmission period;

the information processing unit includes event transmission operation activation means that issues the type number of specified data as a transmission command when update of the specified data out of the transmission target data in the memory unit is detected;

the packet data generation means includes regular transmission packet data generation means that retrieves the type number of each transmission target data listed corresponding to the packet number issued as a transmission command from the first data table when the packet number is issued as the transmission command by the regular transmission operation activation means, retrieves the transmission target data of each type number from the memory unit, retrieves the location position information listed corresponding to the retrieved each type number respectively, and arranges the transmission target data retrieved from the memory unit based on the retrieved location position information, and thereby generates the packet data of the packet number issued as the transmission command;

event transmission packet data generation means that, when the event transmission operation activation means issues the type number as a transmission command, retrieves the packet number listed corresponding to the type number of the transmission command from the second data table and then retrieves the type number of each transmission target data listed corresponding to the retrieved packet number from the first data table retrieved the transmission target data of the type number from the memory unit and also retrieves the position information listed corresponding to the retrieved type number from the second data table, arranges the transmission target data retrieved from the memory unit based on the retrieved location position information, and thereby generates a packet data that includes the data of the type number issued as the transmission command; and the information processing unit includes transmission means for transmitting the packet data generated by the regular transmission packet data generation means and the event transmission packet data generation means to the communication opponent.

9. An automobile control system as in claim 8, wherein:

the first data table further stores a transmission period used for transmitting the packet data of the packet number for each of the packet number; and the regular transmission operation activation means issues each packet number listed in the first data table every transmission period listed in the data table corresponding to the packet number as the transmission command.

10. An automobile control system as in claim 8, wherein:

the information processing unit includes both of the conversion program storage means and the packet data generation means;

the second data table further stores storage position information that indicates the storage position of the conversion program used for subjecting the transmission target data of the type number to the accuracy conversion process in the conversion program storage means for each type number of the transmission target data; and the regular transmission packet data generation means and the event transmission packet data generation means retrieve the storage position information listed corresponding to the type number of the transmission target data from the second data table for all the transmission target data retrieved from the memory unit and activates the conversion program stored at the storage position indicated by the storage position information that is retrieved to process the transmission target data to thereby subjecting the transmission target data retrieved from the memory unit to the accuracy conversion process, arranges the accuracy-converted transmission target data based on the location position information retrieved from the second data table to thereby generate the packet data.

11. A method of processing control data in an information processing unit for transmission to a communication opponent in an automobile comprising the steps of:

performing arithmetic calculation for controlling a target;

storing a plurality of calculated data in a first memory, each of the calculated data having a first resolution required in the information processing unit;

converting the stored data to corresponding data having a second resolution different from the first resolution, the second resolution being required in the communication opponent;

generating a packet data using the corresponding data; and transmitting the packet data to the communication opponent which uses the corresponding data transmitted as the packet data, wherein the converting step retrieves, in a conversion process of each of the stored data thereof, a predetermined program of a plurality of conversion programs respectively stored in a second memory in correspondence with the plurality of the calculated data, and converts each of the stored data by the retrieved conversion program.

12. A method of processing control data in an information processing unit for transmission to a communication opponent comprising the steps of:

performing arithmetic calculation for controlling a target;

storing a plurality of calculated data in a memory;

generating a common packet data of the stored data in a predetermined order;

generating a transmission command;

generating a transmission packet data from the common packet data in response to the transmission command; and transmitting the transmission packet data to the communication opponent for use in the communication opponent, wherein packet data generating step determines a type of transmission packet data in response to the transmission command, retrieves the stored data required in the determined type of transmission packet data based on a first data table storing a plurality of required control data with respect to each type of the transmission packet data, and rearranging the retrieved data in the transmission packet data based on a second table storing a position of each data in the common packet data.

13. A method as in claim 12 further comprising accuracy converting the stored data, the stored data having a first resolution, to corresponding data having a second resolution different from the first resolution and being required in the communication component.

* * * * *